(12) United States Patent
Kariyada et al.

(10) Patent No.: US 9,714,105 B2
(45) Date of Patent: Jul. 25, 2017

(54) APPARATUS FOR SUPPLYING A LARGE AMOUNT OF BAG

(71) Applicant: FURUKAWA MFG. CO., LTD., Shinagawa-ku, Tokyo (JP)

(72) Inventors: Teruyoshi Kariyada, Tokyo (JP); Hiromasa Yamashita, Tokyo (JP); Masayoshi Tsuchiya, Tokyo (JP)

(73) Assignee: FURUKAWA MFG. CO., LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 14/646,929

(22) PCT Filed: Dec. 4, 2013

(86) PCT No.: PCT/JP2013/082527
§ 371 (c)(1),
(2) Date: May 22, 2015

(87) PCT Pub. No.: WO2014/088016
PCT Pub. Date: Jun. 12, 2014

(65) Prior Publication Data
US 2015/0307219 A1 Oct. 29, 2015

(30) Foreign Application Priority Data

Dec. 6, 2012 (JP) .................................. 2012-266949
Sep. 26, 2013 (JP) .................................. 2013-199693

(51) Int. Cl.
*B65B 43/18* (2006.01)
*B65H 3/08* (2006.01)
(Continued)

(52) U.S. Cl.
CPC .............. *B65B 43/18* (2013.01); *B65B 43/14* (2013.01); *B65B 43/30* (2013.01); *B65B 57/12* (2013.01);
(Continued)

(58) Field of Classification Search
CPC ................................................. B65H 2511/13
(Continued)

(56) References Cited

U.S. PATENT DOCUMENTS 4,078,784 A * 3/1978 Miaskoff .................. B65H 5/12
270/56
4,228,886 A * 10/1980 Moran .................. G01B 11/002
198/395
(Continued)

FOREIGN PATENT DOCUMENTS

CN 1169945 A 1/1998 ............. B65B 43/18
JP 50-126659 U 3/1974
(Continued)

OTHER PUBLICATIONS

Office Action received in corresponding Chinese Patent Application No. 201380059376.3, dated Jan. 22, 2016.
(Continued)

*Primary Examiner* — Gregory Adams
(74) *Attorney, Agent, or Firm* — Kusner & Jaffe

(57) ABSTRACT

An apparatus for supplying a large amount of bags includes: a bag stocking mechanism that stocks a large amount of raised bags and guides the stocked bags to the front end thereof; and a bag transport mechanism that transports the bags of the bag stocking mechanism to a packaging machine. The apparatus further includes, a bag pickup mechanism and a bag delivery mechanism that pick up the bag from the bag stocking mechanism; a detection unit that detects the orientation of the picked up bag; and a bag turning mechanism that turns the bag in the predetermined transport direction of the bag transport mechanism according to the orientation of the bag detected by the detection unit.

19 Claims, 21 Drawing Sheets

(51) Int. Cl.
- *B65H 1/02* (2006.01)
- *B65B 43/14* (2006.01)
- *B65H 3/38* (2006.01)
- *B65H 3/48* (2006.01)
- *B65H 5/10* (2006.01)
- *B65H 5/14* (2006.01)
- *B65H 7/02* (2006.01)
- *B65B 43/30* (2006.01)
- *B65B 57/12* (2006.01)
- *B65B 59/00* (2006.01)
- *B65G 47/91* (2006.01)

(52) U.S. Cl.
CPC ........... *B65B 59/005* (2013.01); *B65H 1/025* (2013.01); *B65H 3/0808* (2013.01); *B65H 3/0883* (2013.01); *B65H 3/38* (2013.01); *B65H 3/48* (2013.01); *B65H 5/10* (2013.01); *B65H 5/14* (2013.01); *B65H 7/02* (2013.01); *B65G 47/915* (2013.01); *B65H 2301/33216* (2013.01); *B65H 2301/4473* (2013.01); *B65H 2301/44716* (2013.01); *B65H 2301/44722* (2013.01); *B65H 2404/232* (2013.01); *B65H 2405/211* (2013.01); *B65H 2511/13* (2013.01); *B65H 2511/216* (2013.01); *B65H 2701/11252* (2013.01); *B65H 2701/191* (2013.01)

(58) Field of Classification Search
USPC .............. 414/936; 53/544, 570, 571, 63, 67; 700/114, 213, 22, 229
See application file for complete search history.

(56) References Cited

U.S. PATENT DOCUMENTS

| | | | | |
|---|---|---|---|---|
| 4,462,585 A * | 7/1984 | Gieson | ..................... | B65H 7/12 271/11 |
| 4,971,515 A * | 11/1990 | Pol | ........................ | B21D 43/18 271/262 |
| 5,848,868 A * | 12/1998 | Suzuki | .............. | H01L 21/67778 356/399 |
| 5,860,269 A | 1/1999 | Takahashi et al. | ................ | 53/64 |
| 5,890,348 A | 4/1999 | Nützi et al. | ...................... | 53/481 |
| 6,024,533 A * | 2/2000 | Redden | .................... | B65H 5/20 271/150 |
| 6,665,588 B2 * | 12/2003 | Watanabe | ................ | B23Q 7/04 414/796.5 |
| 7,293,591 B2 * | 11/2007 | Nakagawa | .............. | B65B 15/04 156/362 |
| 7,530,447 B2 * | 5/2009 | Fritsche | .................... | B07C 1/04 198/644 |
| 2010/0180550 A1 * | 7/2010 | Yamamoto | ................ | B65B 3/06 53/459 |

FOREIGN PATENT DOCUMENTS

| | | | | |
|---|---|---|---|---|
| JP | 59-133545 U | 9/1984 | ................ | B65H 3/08 |
| JP | 61-59507 U | 4/1986 | ............ | B65B 43/14 |
| JP | 04-064538 | 2/1992 | ............ | B65H 3/30 |
| JP | 05-124751 | 5/1993 | ............ | B65H 7/18 |
| JP | 05-94109 U | 12/1993 | ............ | B65B 43/44 |
| JP | 06-040427 | 2/1994 | ............ | B65B 43/18 |
| JP | 09-086706 | 3/1997 | ............... | B65H 3/54 |
| JP | 10-167222 | 6/1998 | ............ | B65B 43/18 |
| JP | 2001-163314 | 6/2001 | ............ | B65B 61/26 |
| JP | 2007-039113 | 2/2007 | ............ | B65B 43/18 |
| JP | 2007-290768 | 11/2007 | ............ | B65B 43/18 |
| TW | 276234 | 5/1996 | ............ | B65B 51/02 |

OTHER PUBLICATIONS

International Search Report issued in corresponding International Patent Application No. PCT/JP2013/082527, dated Mar. 11, 2014.
Office Action issued in corresponding Taiwanese Patent Application No. 102144995 dated Mar. 15, 2017.

* cited by examiner

APPARATUS FOR SUPPLYING A LARGE AMOUNT OF BAG

RELATED APPLICATIONS

This application is a National Stage of International Application No. PCT/JP13/82527 filed Dec. 4, 2013, which claims the benefit of Japanese Patent Application No. 2012-266949, filed Dec. 6, 2012, and Japanese Patent Application No. 2013-199693, filed Sep. 26, 2013.

FIELD OF THE INVENTION

The present invention relates to an apparatus for supplying a large amount of bags, the apparatus supplying a large volume of zipper bags vertically stocked in a standing position in alignment, for example, a standing pack and a gusset bag, to a packaging machine.

BACKGROUND OF THE INVENTION

A typical rotary packaging machine includes a clamp on the outer edge of a rotary filling table. A bag sucked by a sucking device is delivered from a bag supplying apparatus to the clamp by a delivery device and then is rotated and transported while being filled with a material to be packaged. After that, the opening of the bag is sealed to package the material. In an existing bag supplying apparatus, about 200 bags can be stocked at the same time. In the case of a packaging machine capable of packaging 50 bags per minute, an operation continues for about four minutes. This requires an operator dedicated to constantly refill bags to the bag supplying apparatus.

In Japanese Patent Laid-Open No. 2007-290768, a vertical bag-stocking mechanism is used to store a large number of bags in a standing position. The bag stocking mechanism can simultaneously stock a large number of bags with space saving and stability, reducing the number of times of refilling of bags by an operator.

FIG. 21 is a schematic diagram of a related bag supplying apparatus disclosed in Japanese Patent Laid-Open No. 2007-290768. The bag supplying apparatus includes a bag stocking mechanism 1 that stores a large number of stacked bags W and transport the bags W forward, a bag positioning mechanism 2 that transports the bags W one by one and positions the bags W at a predetermined point before the bags W are supplied to a packaging machine (not shown), bag delivery mechanisms 3 that are disposed between the bag stocking mechanism 1 and the bag positioning mechanism 2, receives the bags W one by one from the bag stocking mechanism 1, and delivers the bags W to the bag positioning mechanism 2, and a bag supplying mechanism 4 that supplies the bag W positioned at the predetermined point of the bag positioning mechanism 2 to the packaging machine.

The bag stocking mechanism 1 stores the multiple bags W placed in a standing position with the openings directed upward, transports the bags W forward, and positions the front bag W at the predetermined point on the front side of the bag stocking mechanism 1 in a transport direction. The bag stocking mechanism 1 includes a frame 6 mounted on a stand 5, a pair of right and left cassette guide members 7 mounted on the frame 6, and first conveyors 8 mounted in the frame 6.

The frame 6 includes a receiver 9 gently tilting forward and a pair of right and left side plates 11. The front and rear ends of the side plates 11 longitudinally protrudes from the receiver 9. Support shafts 15 and 16 are rotatably supported in a horizontal direction by the side plates such that pulleys 13 and 14 at the front and rear of the first conveyors 8 are fixed on the support shafts 15 and 16. A conveyor belt 17 is longitudinally looped over the pulleys 13 and 14. The upper side of the conveyor belt 17 is supported over the receiver 9. The support shafts 15 and 16 in FIG. 21 are intermittently rotated counterclockwise by a motor (not shown), allowing the conveyor belt 17 to intermittently rotate forward (to the left in FIG. 21) while sliding on the receiver 9.

The cassette guide member 7 includes a plate part 18 disposed in a vertical plane along the transport direction of the first conveyor 8 (also the transport direction of the bag W) and first stoppers 19 formed on the front end of the plate part 18 so as to be perpendicular to the transport direction. The pair of right and left cassette guide members 7 is disposed with an adjustable spacing on the receiver 9. The first stoppers 19 acting as stoppers are opposed to each other. A front bag Wa of the bags W stored in the bag stocking mechanism 1 comes into contact with the first stoppers 19 and thus is positioned thereon. The front bag Wa comes into contact with the first stoppers 19 with a predetermined width only in the vicinity of both side edges of the bag Wa.

The bag stocking mechanism 1 includes a bag supply cassette 21. The bag supply cassette 21 is substantially shape like an open box, accommodating the multiple bags W disposed in a vertical plane along the transport direction of the first conveyor 8 in a standing position with the openings directed upward. The bottom wall of the bag supply cassette 21 supports the vicinity of both bottom edges of the bags W. Both side edges of the bag W are restricted by the side walls of the bag supply cassette 21 while the bags W are transported forward by the first conveyor 8.

The bag stocking mechanism 1 further includes a bag retainer 29. The bag retainer 29 is placed on the first conveyor 8 and is moved forward with the bags w; meanwhile, the retainer 29 holds the rear ends of the multiple bags W stored in the bag supply cassette 21 so as to keep the standing position of the bags W.

The operations of the bag supplying apparatus are performed as follows:

(1) First, the bag supply cassette 21, in which the multiple bags W are stacked and stored in a standing position with the openings directed upward, is inserted between the cassette guide members 7 and is placed on the receiver 9, and then the bag retainer 29 is placed at the rear of the bag supply cassette 21.

(2) A shutter for fixing the bags W is picked up and then the first conveyor 8 is driven one time. Thus, the front bag Wa in the cassette comes into contact with the first stoppers 19 and is positioned at a pickup point. The rear ends of the bags in the cassette are held by the bag retainer 29.

(3) The bag delivery mechanisms 3 of the rotor 31 are rotated to suck and pick up the front bag Wa positioned at the pickup point. Each time the bag Wa is picked up, the first conveyor 8 is intermittently driven to transport the remaining bags accordingly in the bag supply cassette 21. In each time of pickup, the front bag Wa comes into contact with the first stoppers 19 and is positioned at the pickup point.

(4) When all the bags W in the bag supply cassette 21 are picked up, an operator detaches the bag supply cassette 21 and then sets another bag supply cassette 21 accommodating the multiple bags W (changing of cassettes), thereby refilling the bag stocking mechanism 1 with bags.

The bag stocking mechanism 1 in Japanese Patent Laid-Open No. 2007-290768 includes the bag retainer 29 that retains the rear ends of the bags in the bag supply cassette 21 and presses the bags forward in parallel while keeping the standing positions of the bags W. However, in the case of zipper bags such as a standing pack and a gusset bag that vary in thickness in a vertical direction (between the opening and bottom of the bag), a difference in thickness in the vertical direction among the bags increases with the number of bags. Thus, the bags may be curved so as to rise in an improper position in the bag stocking mechanism, causing suction holding members 32 to incorrectly suck the bags. Thus, with the related bag stocking mechanism 1, even if the bags W are placed in a standing position, this configuration limits the number of bags that can be set at the same time.

The present invention has been devised to solve the problem. An object of the present invention is to provide an apparatus for supplying a large amount of bags, the apparatus being capable of stocking a large amount of bags and allowing a packaging machine to continuously operate for a longer time than the related art.

SUMMARY OF THE INVENTION

An apparatus for supplying a large amount of bags according to the present invention is an apparatus for supplying a large amount of bags, each being stocked to be picked up and supplied to a packaging machine, the apparatus including a bag stocking unit having a mechanism that stocks a large amount of bags and guides the stocked bags to the front end of the unit; and a bag transport unit that transports the bags of the bag stocking unit to the packaging machine, wherein the apparatus includes, between the bag stocking unit and the bag transport unit, a bag pickup unit that picks up the bag from the bag stocking unit; a bag orientation detection unit that detects the orientation of the bag; and a bag turning unit that turns the bag in a predetermined direction of the bag transport unit according to the bag orientation detected by the bag orientation detection unit.

A refill tool for the apparatus for supplying a large amount of bags according to the present invention is a refill tool for refilling the bag stocking passage of the bag stocking unit with the bags, including partition plates that are shaped to be fit into the bag stocking passage and are connected via a connecting plate with a predetermined distance.

With this configuration, the apparatus for supplying a large amount of bags according to the present invention stocks the bags in the bag stocking unit so as to equalize the thicknesses of the bags with the laterally reversed openings, thereby stocking a large amount of bags.

Moreover, with this configuration, the refill tool for the apparatus for supplying a large amount of bags according to the present invention can easily refill the bag stocking unit with the bags.

DESCRIPTION OF THE PREFERRED EMBODIMENTS

Figure 1:
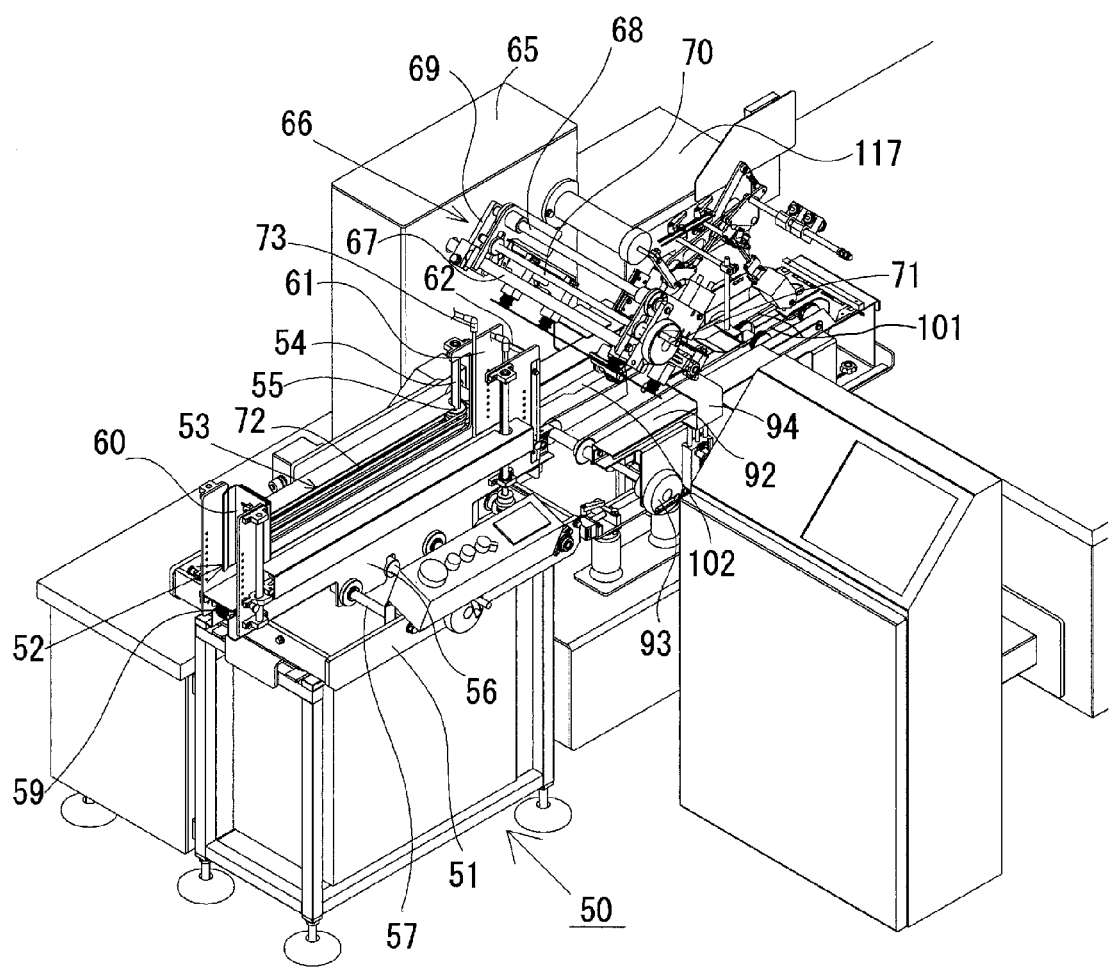
FIG. 1 is an overall perspective view of an apparatus for supplying a large amount of bags according to the present invention.
Figure 2:
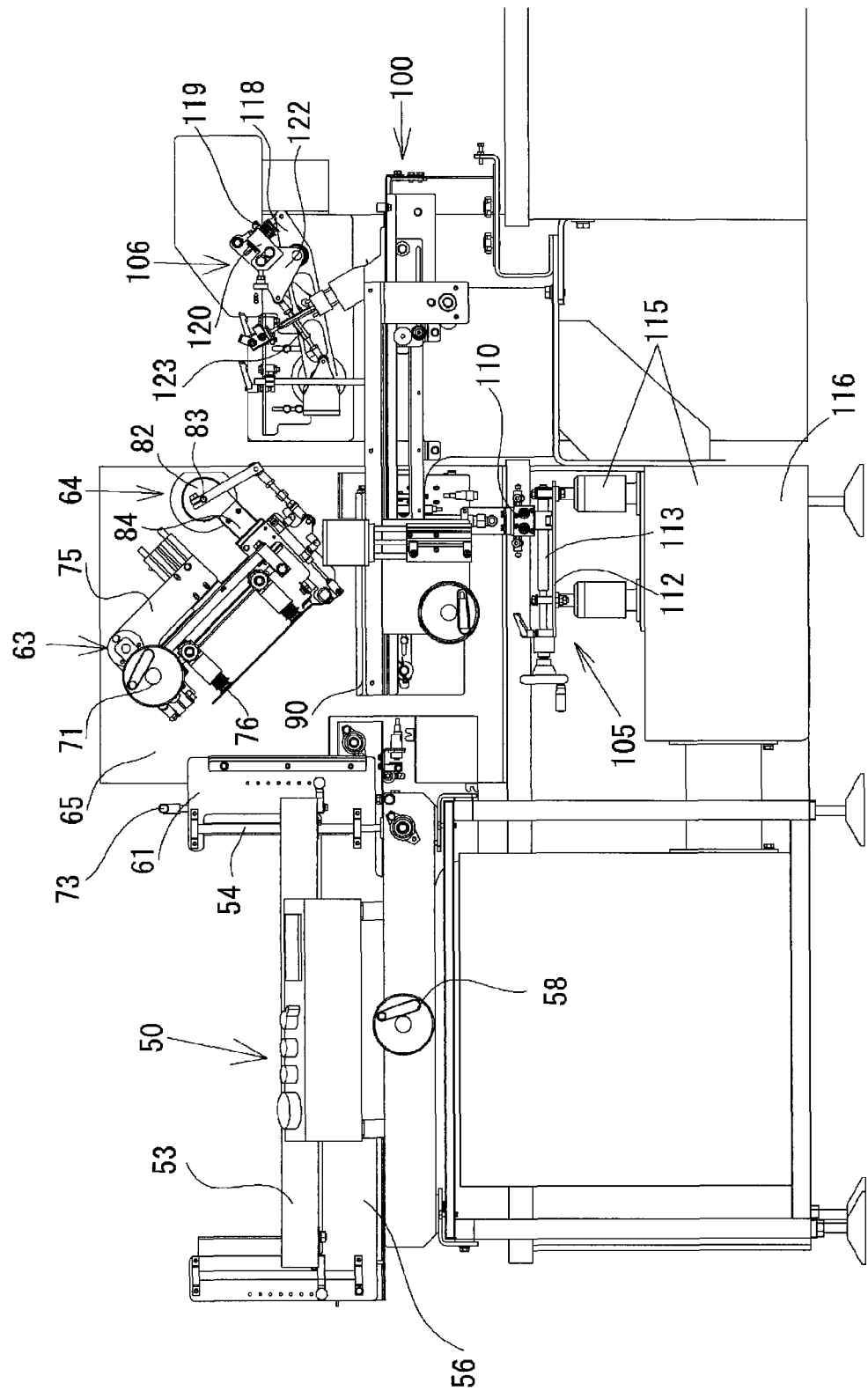
FIG. 2 is an overall front view of the apparatus for supplying a large amount of bags according to the present invention.
Figure 3:
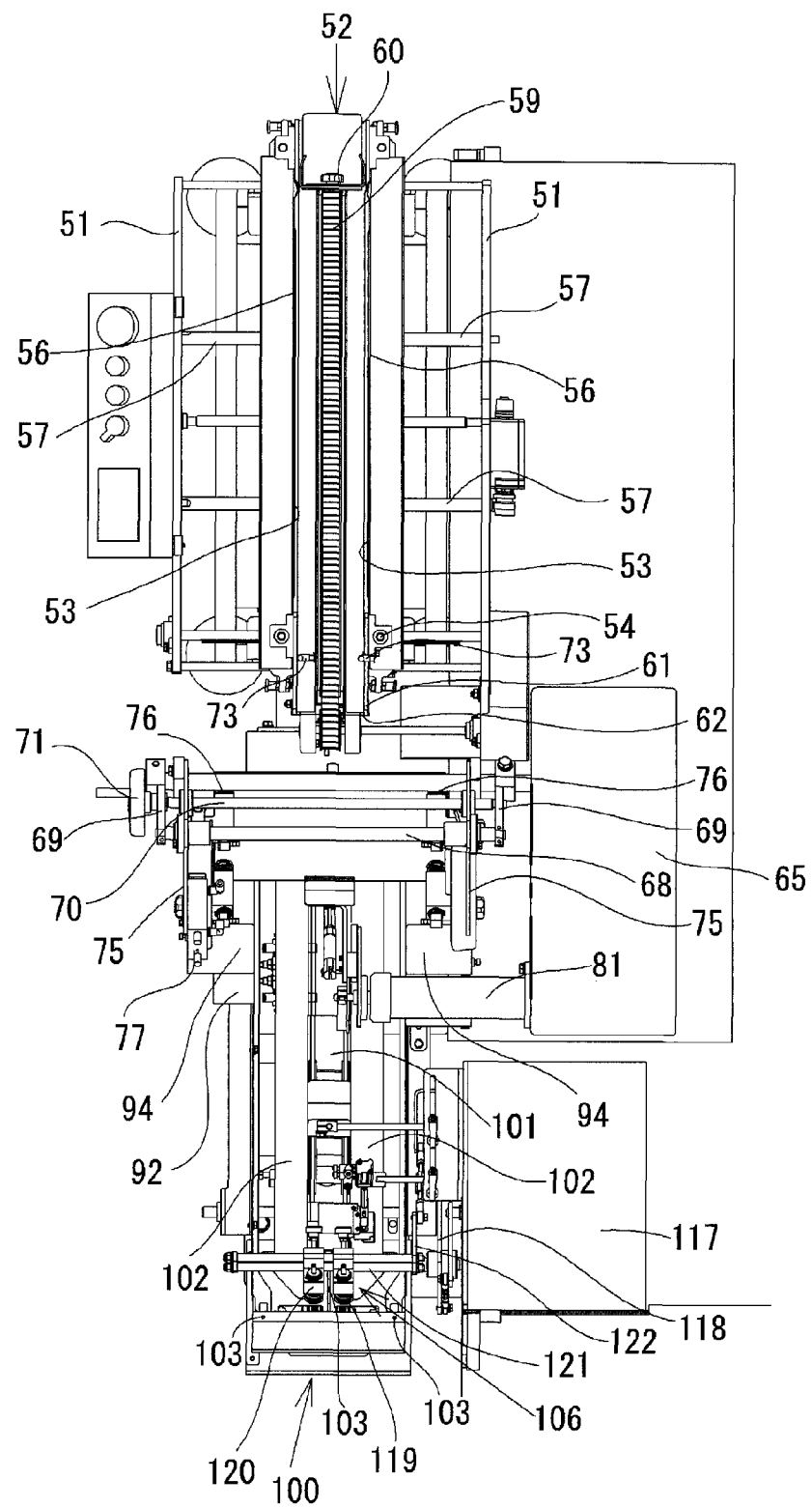
FIG. 3 is an overall plan view of the apparatus for supplying a large amount of bags according to the present invention.

FIG. 1 is a perspective view showing an apparatus for supplying a large amount of bags according to the present invention. FIG. 2 is a front view of the apparatus. FIG. 3 is a plan view of the apparatus. The apparatus for supplying a large amount of bags according to the present embodiment includes a bag stocking unit that has a mechanism for stocking a large amount of raised bags W and guiding the stocked bags to the front end of the apparatus, and a bag transport unit that transports the bags W of the bag stocking unit to the packaging machine. The apparatus further includes a bag pickup unit provided between the bag stocking unit and the bag transport unit so as to pick up a bag W from the bag stocking unit, a bag orientation detection unit that detects the orientation of the bag W picked up by the bag pickup unit, and a bag turning unit that turns the bag W in a predetermined direction of the bag transport unit according to the orientation of the bag W detected by the bag orientation detection unit. These units will be described below.

(Bag Stocking Unit)

In FIG. 1, a bag stocking mechanism 50 acting as the bag stocking unit is disposed at the front of the apparatus for supplying a large amount of bags. The bag stocking mechanism 50 includes a bag stocking passage 52 longitudinally provided at the center of a pedestal 51 composed of rectangular plates. In the bag stocking passage 52, a large amount of bags is placed in a standing position with the horizontally oriented openings. The bags are zipper bags such as a standing pack and a gusset bag. A flat bag or the like may be used instead. In the case of the bags W varying in thickness between the opening side and the bottom side, a difference in thickness between the opening side and the bottom side increases with the number of bags W staked in the same direction, leading to a twist of the bags. Thus, the bags W may be risen in an incorrect position in the bag stocking mechanism 50 and incorrectly picked up by the bag pickup unit. To address this problem, the opening sides and bottom sides of a certain number of the bags W, e.g., ten or twenty of the stocked bags W may be laterally reversed so as to equalize differences in thickness between the opening side and the bottom side. Thus, the bags W are stocked in the bag stocking passage 52 entirely uniformly in proper alignment without deformation.

Side feed conveyors 53 are disposed on both sides of the bag stocking passage 52. The side feed conveyor 53 has a strip belt 72 looped over a driving pulley 55, which is provided on a rod-like rotating shaft 54 raised at the front of the conveyor 53, and a driven pulley (not shown) at the rear of the conveyor 53. The rotation of the rotating shaft 54 rotates the strip belt 72 so as to slowly deliver the bags forward. The side feed conveyors 53 are mounted on frames 56 disposed in the longitudinal direction of the pedestal 51. The frames 56 are supported by a plurality of installation rods 57 extended in the width direction of the pedestal 51. The frame 56 is slidable in the width direction of the pedestal 51. A distance between the frames 56 and a distance between the side feed conveyors 53 are adjusted according to the dimensions of the bag W by rotating a handle 58 in FIG. 2.

A bag pressing belt 59 is longitudinally provided at the center of the bottom of the bag stocking passage 52, and a bag pressing member 60 is set on the bag pressing belt 59 so as to be vertically detached. When the bag pressing belt 59 is rotated, the bag pressing member 60 is slowly moved forward to press the bags stocked in the bag stocking passage 52 from the rear to the front, delivering the bags to the bag pickup unit.

On the bag stocking passage 52, a gate plate 61 is provided on the end of the frame 56 having the side feed conveyor 53. A stopping plate 62 is placed across the upper parts of the ends of the plates 61 (See FIGS. 1 and 3). The stopping plate 62 holds a front bag Wa of the bags pressed forward of the bag stocking passage 52 by means of the side feed conveyor 53 and the bag pressing member 60 so as not to protrude until the bag Wa is delivered to the bag pickup unit, which will be described later.

Figure 4:
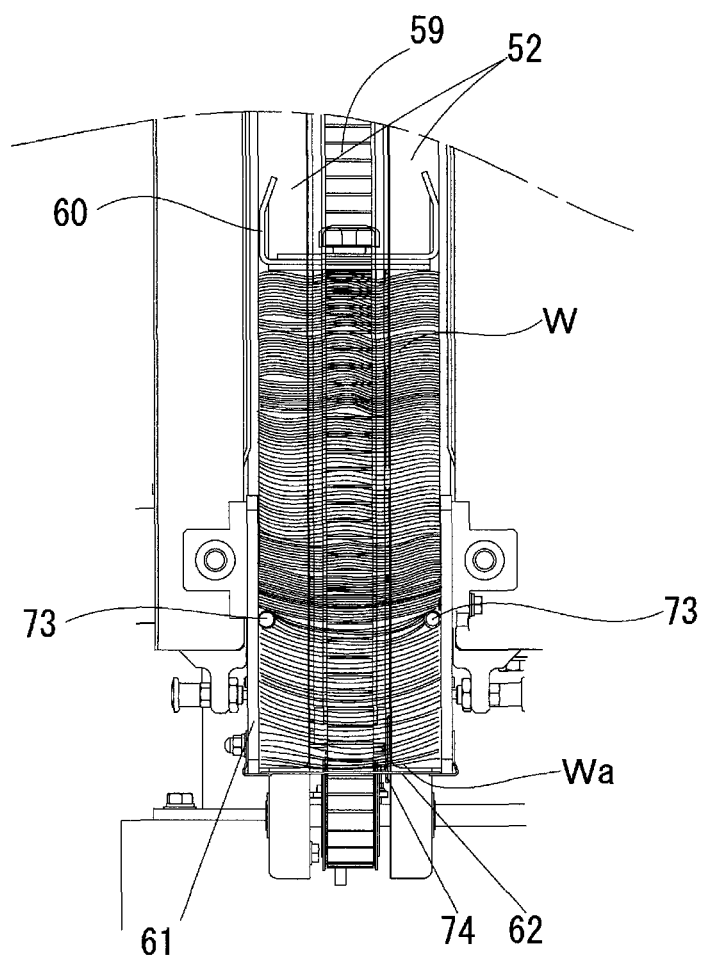
FIG. 4 is a partial plan view of the apparatus for supplying a large amount of bags according to the present invention.

As shown in FIG. 4, alignment rods 73 are raised inside the gate plates 61. The alignment rod 73 is a hollow pipe that is connected to an air source and has an injection hole (not shown) opened forward. The alignment rods 73 curve the bags stocked in the bag stocking passage 52 so as to protrude forward, allowing a bag detection piece 74 on the end of the bag stocking passage 52 to detect the bag.

Specifically, the bags W may be curved and thus the bags W simply stocked in the bag stocking passage 52 may become wavy in the rear (an upper part in FIG. 4) as shown in FIG. 4. If the bags W wavy in the rear are pressed by the bag pressing member 60, the bags W curved like waves so as to protrude to the rear may not be detected because the bag W on the end does not come into contact with the bag detection piece 74. If the bag W is not detected by the bag detection piece 74, it is decided that the bags W are absent. Thus, the bag pressing belt 59 is rotated to further deliver the bags forward even if the bags W are present. Since both sides of the bags W vertically varying in thickness are tightly placed in the bag stocking passage 52, the bags W cannot be delivered forward by the rotation of the bag pressing belt 59.

To prevent this problem, the alignment rods 73 are raised inside the gate plates 61 so as to restrict a movement of both sides of the bags W while protruding the centers of the bags W. Thus, the bags W curved and protruded forward are delivered. The front bag Wa of the bags W curved thus can be reliably brought into contact with the bag detection piece 74. In the absence of the bags W, the bag detection portion 74 slightly protrudes upward (upward in the plane of FIG. 4) from the bottom of the bag stocking passage 52 so as to be turned off. The bag detection portion 74 in contact with the bag W retracts downward (downward in the plane of FIG. 4) from the bottom of the bag stocking passage 52 so as to be turned on. The presence or absence of the bags W is detected according to the protrusion and retraction of the bag detection portion 74. The need for the alignment rods 73 may be eliminated depending upon the type of bag W and thus the alignment rods may be detachable.

As has been discussed, the injection hole for air injection is formed on the end of the alignment rod 73. Air from the injection hole is fed to both ends of the bags W, leading to air injection between the bags. Thus, the front bag Wa is easily picked up by suckers 76 of the bag pickup unit, which will be described later. Moreover, air returns an end of the excessively curved bags W to original shapes. The injection hole is not always necessary and the alignment rod 73 does not always need to have a hollow structure. The alignment rod 73 may have any structure as long as a movement of both ends of the bag W is restricted and the center of the bag W is protruded.

(Bag Pickup Unit)

The bag pickup unit is a mechanism that picks up the bag W located on the end of the bag stocking mechanism 50 and delivers the bag W to the bag orientation detection unit. In the present embodiment, the back pickup unit includes a bag pickup mechanism 63 that picks up the bag W from the bag stocking mechanism 50 and a bag delivery mechanism 64 that receives the bag W picked up from the bag pickup mechanism 63 and then delivers the bag W to the bag orientation detection unit, which will be described later.

The bag pickup mechanism 63 has parallel rods 66 that are horizontally supported like cantilevers on one side of a first driving box 65. The parallel rods 66 may be supported on both ends. As shown in FIG. 1, the parallel rods 66 include a main rod 67 and a sub rod 68. Both ends of the rods 67 and 68 are connected via connecting plates 69. The main rod 67 is connected to a drive mechanism (not shown). A screw rod 70 is pivotally supported between the main rod 67 and the sub rod 68. A handle 71 is provided on the end of the screw rod 70. The handle 71 is rotated so as to laterally adjust an interval between the suckers 76, which will be described later.

Figures 5A, 5B:
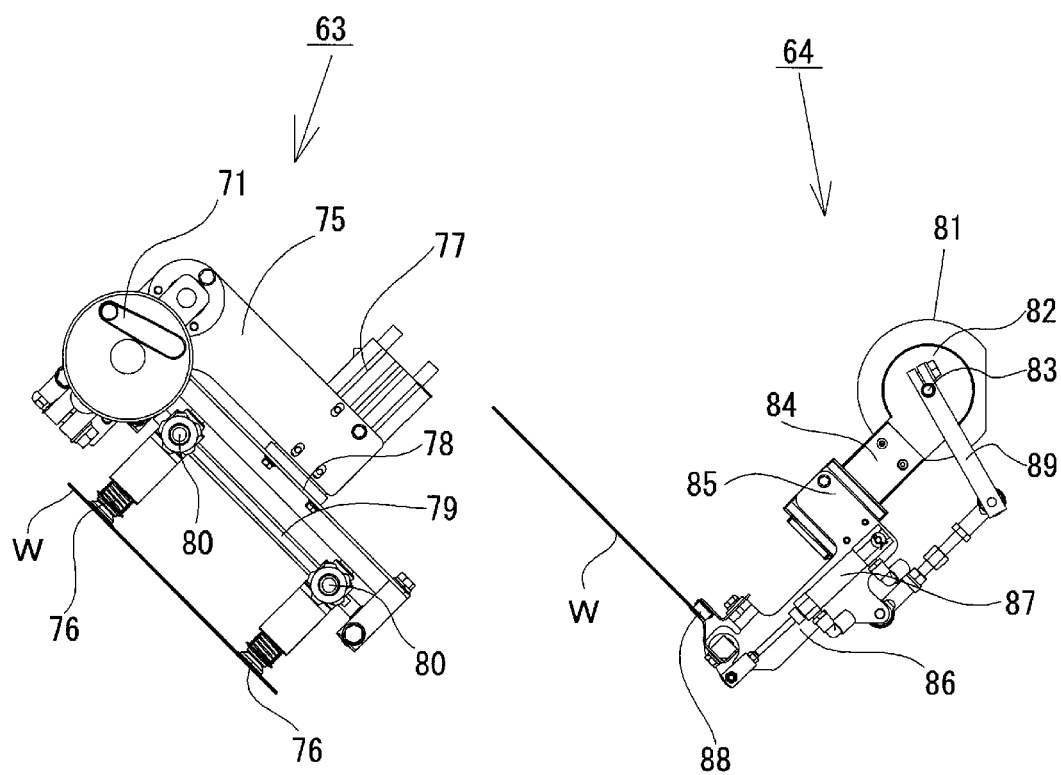
FIG. 5(a) is a front view of a bag pickup mechanism and FIG. 5(b) is a front view of a bag delivery mechanism.

On both ends of the parallel rods 66, slide plates 75, which are shaped like reversed letter L in front view in FIG. 5(A), are slidably provided inside the connecting plates 69. The slide plate 75 has formed internal threads in which the screw rod 70 is engaged. The screw rod 70 is rotated by the handle 71 such that the slide plates 75 on both ends move toward and away from each other. This can laterally adjust an interval between the suckers 76. As shown in FIG. 5(A), an air cylinder 77 is attached to the lower end of the slide plate 75. A mounting plate 78 is vertically attached to an operation rod 77A of the air cylinder 77. Slide rods 79 are attached in parallel with the mounting plate 78 to a support piece extending from both ends of the mounting plate 78. The two suckers 76 are fixed on each of the slide rods 79 with screws 80 so as to slide in the vertical direction. Thus, the four suckers 76 in total are fixed on the two slide rods 79. As has been discussed, the distance between the suckers 76,76 can be adjusted by rotating the handle 71. Moreover, the vertical positions of the suckers 76 can be adjusted by loosening the screws 80 so as to slide the suckers 76 along the slide rods 79. In the explanation, the four suckers 76 in two rows and two columns are attached. The upper two left and right suckers 76 are not always necessary because the bag W can be placed on a bag table 90, which will be later described, only by the lower two left and right suckers 76.

The bag delivery mechanism 64 receives the bags W from the bag pickup mechanism 63 and places the bag W on the bag table 90 of the bag orientation detection unit, which will be described later. FIG. 5B is a front view of the bag delivery mechanism 64. The bag delivery mechanism 64 is adjacent to the bag pickup mechanism 63 and is horizontally supported like a cantilever from the first driving box 65. As a matter of course, the bag delivery mechanism 64 may be supported on both ends. A rotary cylinder 81 of the bag delivery mechanism 64 contains an outer shaft 82 and an intermediate shaft 83. A plate-like sliding guide 84 is attached to the outer shaft 82 so as to protrude to the outside. The sliding guide 84 is rotated forward and backward according to a rotation of the outer shaft 82.

A sliding portion 85 slidably covers the sliding guide 84, and a body plate 86 is fixed on the sliding portion 85. An air cylinder 87 is attached in the longitudinal direction of the body plate 86, and a holding portion 88 is pivotally supported on the end of the body plate 86. The holding portion 88 is opened and closed by the air cylinder 87 so as to hold the bag W.

One end of an L-shaped link 89 is connected to the intermediate shaft 83 of the rotary cylinder 81 while the other end of the L-shaped link 89 is connected to the outer portion of the body plate 86. A rotation of the intermediate shaft 83 is transmitted to the link 89, and a folding movement of the link 89 moves forward and backward the sliding portion 85 along the sliding guide 84 via the body plate 86.

(Bag Orientation Detection Unit)

The bag detection unit is a mechanism that causes a detection unit 91 to detect the orientation of the bag W bridged over on the bag table 90 from the bag delivery mechanism 64. The bag orientation unit includes a bag table 90 where the bag W picked up from the bag stocking mechanism 50 is bridged over and the detection unit 91 that detects the thickness of the opening or the bottom of the bag W on the bag table 90 and decides the orientation of the bag W.

Figure 6:
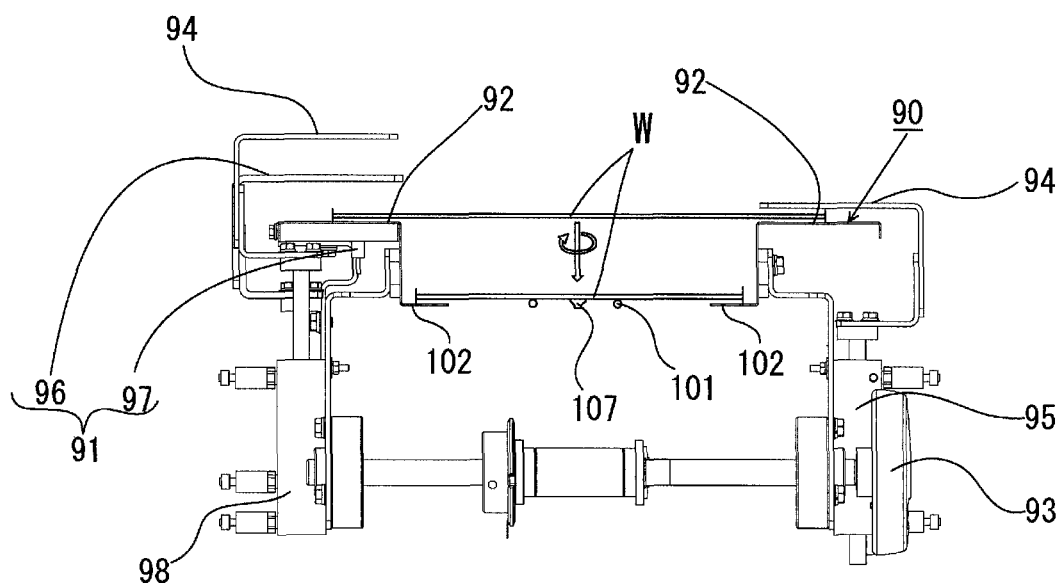
FIG. 6 is a side view of a bag orientation detection unit.
Figure 7:
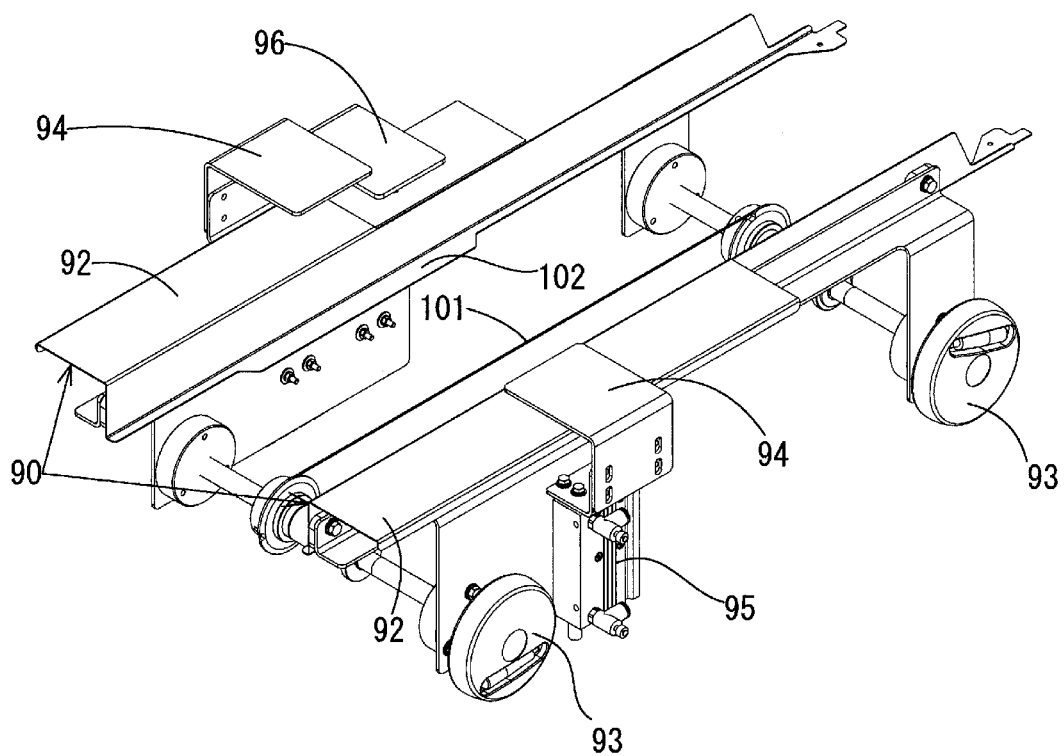
FIG. 7 is a perspective view of a bag table.

FIG. 6 is a side view of the bag table 90. FIG. 7 is a perspective view of the bag table 90. The bag table 90 includes counter parts 92 that are two steel parts extended in parallel with each other. As shown in FIG. 6, the counter part 92 is a steel part shaped like a reversed letter L in cross section. An upper horizontal part belongs to the counter part 92 while a lower horizontal part belongs to a side plate 102. As shown in FIG. 7, the side plate 102 slightly extends like eaves in the horizontal direction. A distance between the counter parts 92,92 is set shorter than the longitudinal dimension of the bag W and longer than the width dimension of the bag W. The width of the bag table 90 can be adjusted with a handle 93 and screws depending upon the bag W. Thus, on the bag table 90 shown in FIG. 6, the opening and bottom of the bag W bridged over in the longitudinal direction of the bag W are placed on the counter parts 92,92, whereas both ends of the bag W rotated in the width direction of the bag W are transferred onto the side plates 102 without being placed on the counter parts 92,92; meanwhile, the bag W is transferred onto a strip belt conveyor 101 of a bag transport mechanism 100, which will be described later.

On the outer sides of the counter parts 92,92 of the bag table 90, U-shaped retainer plates 94 are disposed so as to hold and retain the opening and bottom of the bag W bridged over in the longitudinal direction. The upper part of the retainer plate 94 approaches the counter parts 92 and holds the opening and the bottom of the bag W bridged over on the counter part 92. Thus, when a bag turning sucker 107 of the bag turning unit, which will be described later, moves up from below and comes into contact with the bag W, the bag W is not removed from the bag table 90. The lower end of the retainer plate 94 is connected to an air cylinder 95 that expands and contracts so as to vertically move the retainer plate 94. This can hold and release the bag W on the counter part 92.

The detection unit 91 for measuring the thickness of the bag W is disposed next to the retainer plate 94. As shown in FIG. 6, the detection unit 91 includes a detected plate 96 that is U-shaped like the retainer plate 94, and a measuring sensor 97 that measures the position of the detected plate 96 to measure the thickness of the bag W. Moreover, an air cylinder 98 is connected to the lower end of the detected plate 96. The air cylinder 98 expands and contracts so as to vertically move the detected plate 96, pressing the bag W on the counter part 92. As shown in FIG. 6, when one end of the bag W is held between the detected plate 96 and the counter part 92, the measuring sensor 97 measures a distance from the detected plate 96. Thus, it can be decided whether the detected plate 96 holds the zippered opening of the bag or the bottom of the bag without the zipper. Specifically, the detected plate 96 is slightly lifted on the zippered opening of the bag, resulting in a longer distance than at the bottom of the bag. The opening of the bag is detected thus. Alternatively, the retainer plate 94 and the detected plate 96 may be integrated into a single plate to be detected by the measuring sensor 97 or the retainer plate 94 may also act as the detected plate 96 to be detected by the measuring sensor 97.

(Bag Transport Unit)

The bag transport unit is a bag transport mechanism 100 that is disposed from the lower part of the bag table 90 to a packaging machine and includes a strip belt conveyor 101 that transport the bag W from the lower part of the bag table 90 to a bag opening lift mechanism 106, which will be described. The bag transport mechanism 100 is disposed under the bag table 90. The side plates 102 are disposed in parallel on both sides of the strip belt conveyor 101. The strip belt conveyor 101 is disposed between the side plates 102. As shown in FIG. 6, a distance between the side plates 102 is smaller than the width of the bag W. The bag W turned in the plane direction is transported between the counter parts 92,92 of the bag table 90 by a bag turning mechanism 105, which will be described later, is moved down, and is placed on the side plates 102,102 on both sides and the strip belt conveyor 101. The bag W is supported with both ends placed on the side plates 102,102 and a central part placed on the strip belt conveyor 101. Thus, the bag W is transported to the opening lift mechanism 106 by driving the strip belt conveyor 101.

As shown in FIG. 3, optical sensors 103 are provided at three points on the end of the bag transport mechanism 100. The optical sensor 103 in the rear detects the bag W approaching the front end and reduces the speed of the strip belt conveyor 101 to prevent an overrun of the bag W. The two front sensors are provided to detect whether both ends of the end of the bag W are accurately stopped at a predetermined position without being inclined on the end of the bag transport mechanism 100.

(Bag Turning Unit)

Figure 8:
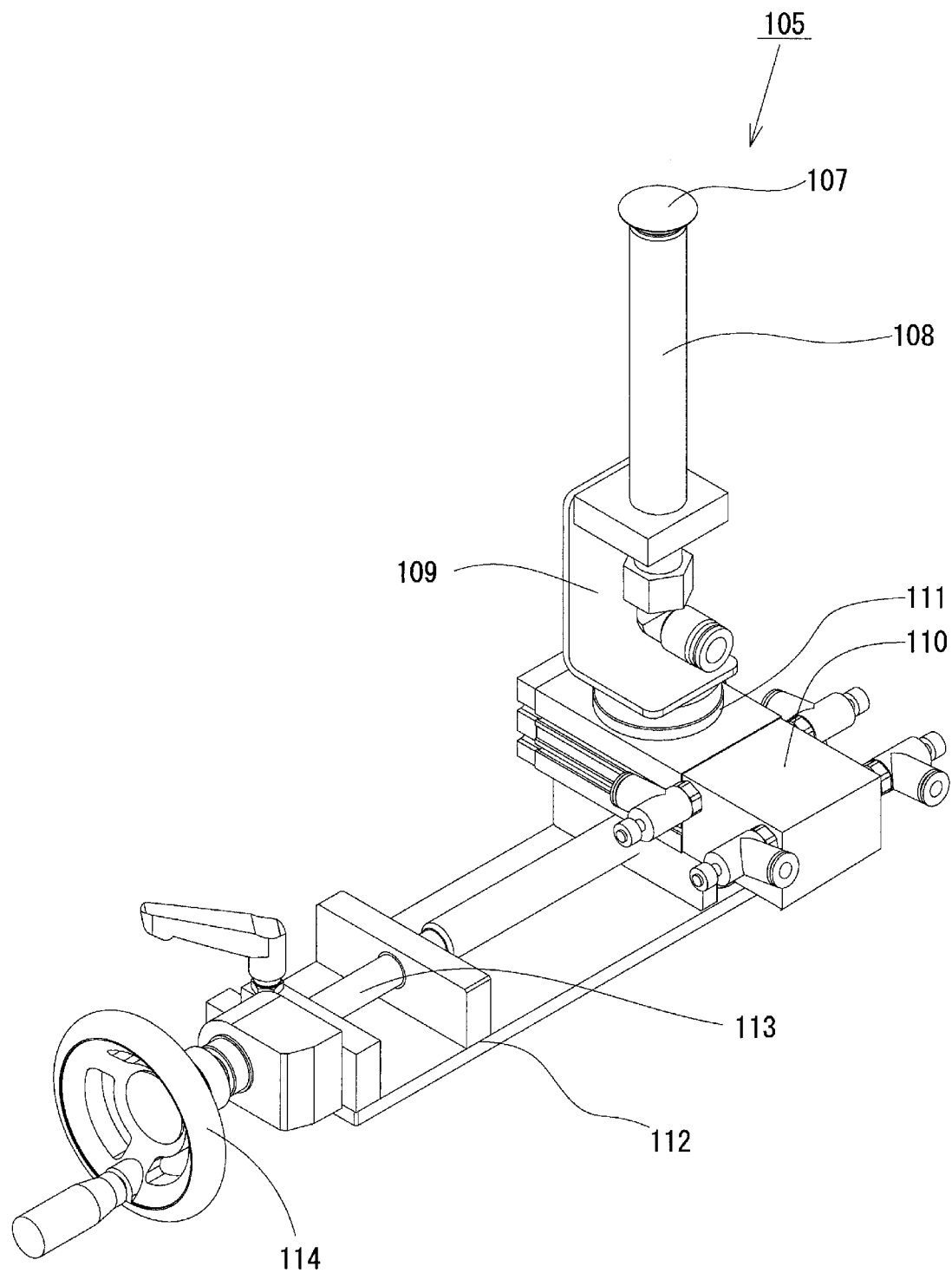
FIG. 8 is a perspective view of a bag turning unit.

FIG. 8 is a perspective view of the bag turning mechanism 105 which is a kind of a bag turning unit. The bag turning mechanism 105 is a mechanism that rotates forward and backward the bag W bridged over on the bag table 90 by the bag delivery mechanism 64. The bag turning mechanism 105 is provided to turn the bag W in a predetermined direction and deliver the bag W to the bag transport mechanism 100. Specifically, the bags W are stocked with the openings and bottoms laterally reversed. If the bags W in this state are transported to the packaging machine by the bag transport mechanism 100, some of the bags W are delivered to the packaging machine with the bottoms placed face up, leading to inconvenience. Thus, the bag orientation detection unit detects the orientation of the bag W on the bag table 90, and then the bag turning mechanism 105 rotates the opening of the bag W downstream such that the opening of the bag W transported by the bag transport mechanism 100 is always sucked by the opening lift mechanism 106.

The bag turning mechanism 105 includes the bag turning sucker 107 on the upper end of a suction pipe 108. The center of the bag W held by the retainer plate 94 is sucked from below by the bag turning sucker 107. A suction hose (not shown) is joined to an elbow on the lower end of the suction pipe 108. The suction pipe 108 is joined to a rotary shaft 111 of a rotary actuator 110 via a bracket 109 and is rotated forward and backward by the air-driven rotary actuator 110. The rotary actuator 110 is slidably set on a rectangular substrate 112 and is connected to one end of a screw thread 113 acting as a positioning mechanism. A handle 114 attached to the other end of the screw thread 113 is rotated to slide the rotary actuator 110 on the substrate 112, adjusting the position of the bag turning sucker 107.

Specifically, as has been discussed, the bag turning sucker 107 is set at the center position of the bag W bridged over on the bag table 90. The bags W vary in dimension among the kinds of bags W, displacing the center position during a change of the bags W. In this case, the handle 114 is rotated to slide the rotary actuator 110, setting the bag turning sucker 107 at the center position of the bag W.

The bag turning mechanism 105 is vertically moved by an elevating unit 115 that supports the substrate 112 from below (See FIG. 2). As shown in FIG. 6, the elevating unit 115 causes the bag turning sucker 107 to suck, from below, the bag W bridged over on the bag table 90, rotate the bag W 90° forward or backward, and move the bag W downward to a lower end position. Thus, the bag W is placed on the side plates 102 and the strip belt conveyor 101. The elevating unit 115 is vertically moved by a crank mechanism (not shown) in a box 116.

(Opening Lift Mechanism)

The opening lift mechanism 106 in FIG. 2 sucks and lifts the opening of the bag W transported to the end of the bag transport mechanism 100 and delivers the bag W to the subsequent bag delivery mechanism (not shown). The bag delivery mechanism delivers the bag W received from the opening lift mechanism 106, to a rotary packaging machine.

The opening lift mechanism 106 is attached to a second driving box 117 adjacent to the first driving box 65. As shown in FIGS. 2 and 3, one end of a link 118 is pivotally supported on a side of the second driving box 117, and a triangular plate 122 is pivotally supported near the other end of the link 118 so as to attach parallel bars 121 for placing blocks 120 of suckers 119. As has been discussed, one ends of the parallel bars 121 are fixed like cantilevers to the triangular plate 122. The block 120 having the two suckers 119 is held by the parallel bars 121.

The opening lift mechanism 106 pivots one end of the link 118 clockwise by means of a drive mechanism in the second driving box 117. When the other end of the link 118 reaches the lower end position, the suckers 119 face downward so as to suck the bag W stopped on the end of the bag transport mechanism 100. When one end of the link 118 is rotated counterclockwise, the action of two rods 123 connected to the triangular plate 122 and the parallel bars 121 moves the suckers 119 higher than the link 118. Subsequently, the bag W on the suckers 119 is received by the bag delivery mechanism in the subsequent process and then is delivered to the rotary packaging machine.

The opening lift mechanism 106 and the bag delivery mechanism are basically identical to mechanisms set for related bags and boxes or strip conveyor bag feeders.

For example, about 3000 bags can be simultaneously set in such an apparatus for supplying a large amount of bags. If 50 bags can be handled per minute, an operation can be continued for 60 minutes. Thus, it can be expected that an operator who refills the apparatus with bags would also deal with a different operation. Moreover, the bags W can be set upright in landscape orientation and the openings can be automatically identified. According to this method, even in the case of a large amount of zippered bags that may be curved to one side, the bags W are alternately set in opposite directions, allowing the apparatus to have a relatively short length.

A usage condition of the apparatus for supplying a large amount of bags will be described below.

Figure 9:
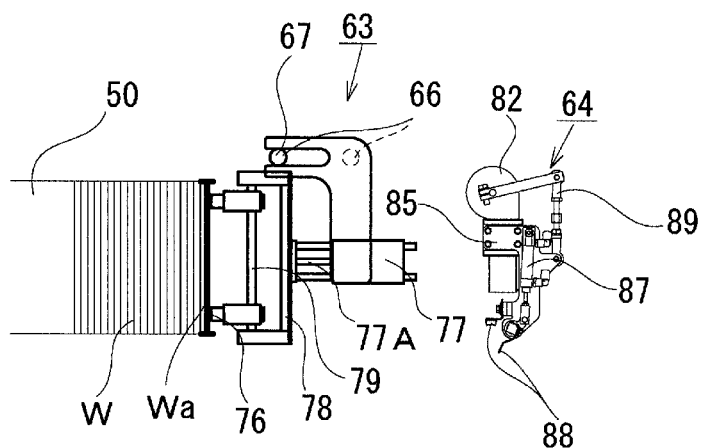
FIGS. 9(1) and 9(2) are partial views of a usage condition of the apparatus for supplying a large amount of bags.
Figure 9:
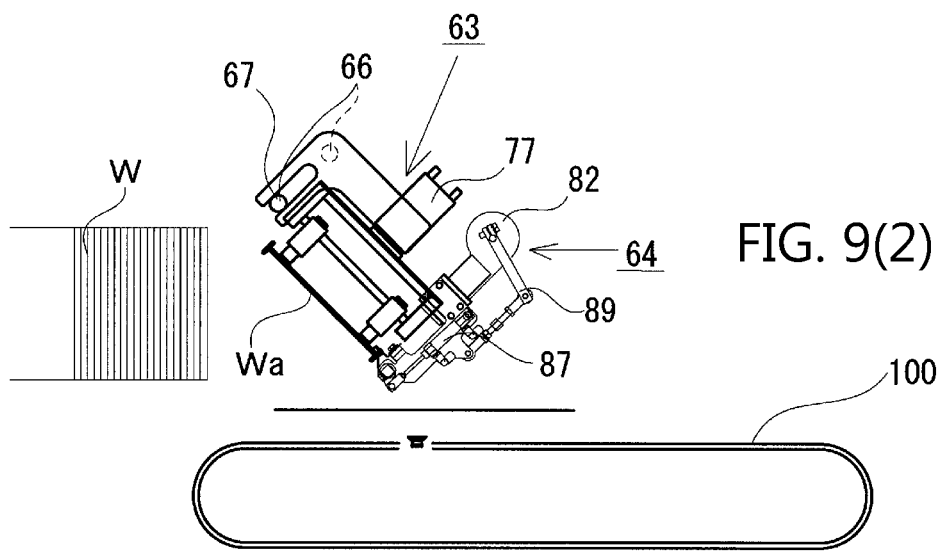
Figure 10:
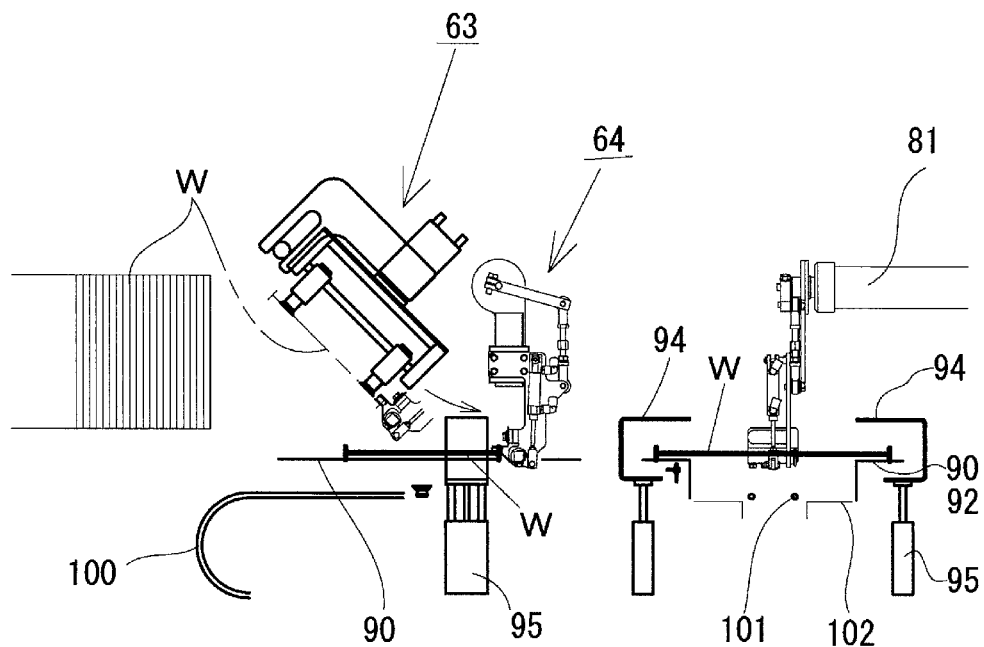
FIGS. 10(3) and 10(4) are partial views of a usage condition of the apparatus for supplying a large amount of bags.
Figure 10:
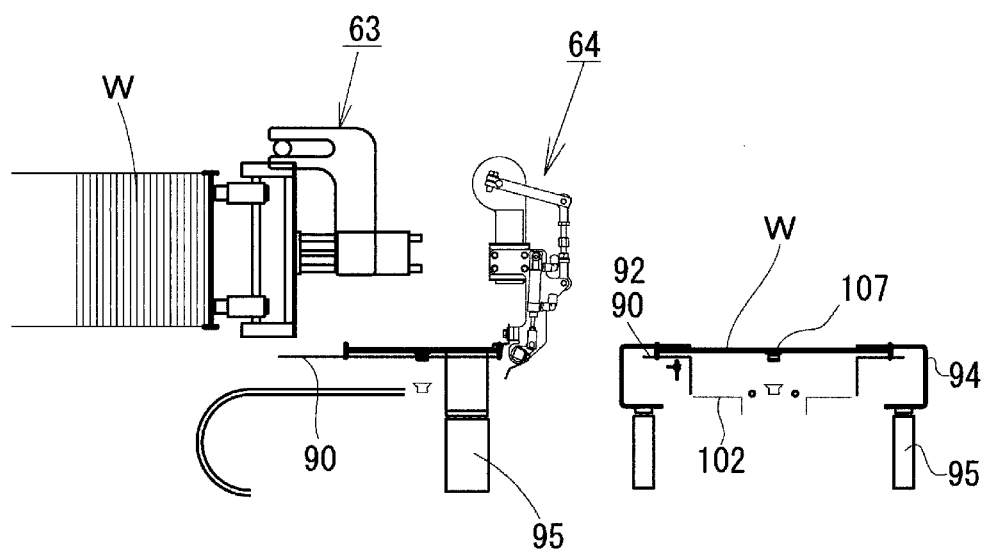
Figure 11:
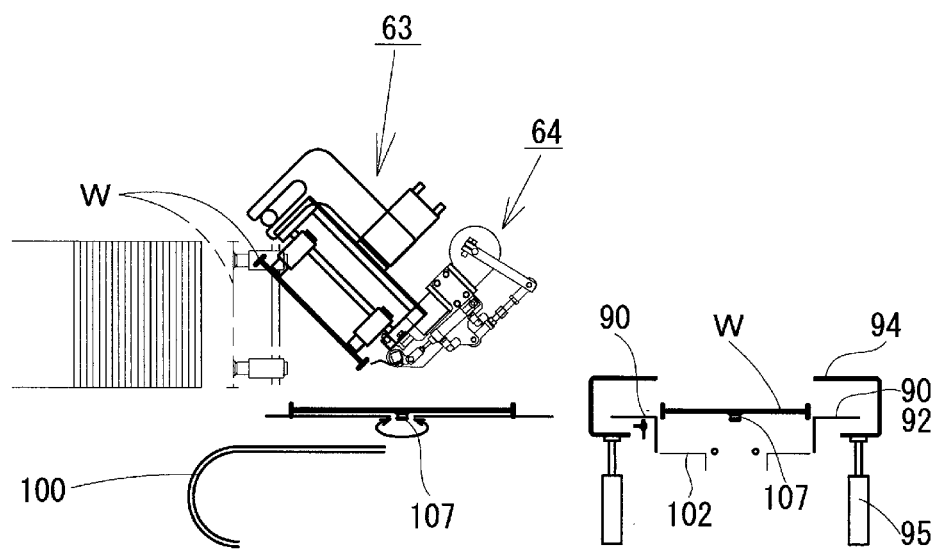
FIGS. 11(5) and 11(6) are partial views of a usage condition of the apparatus for supplying a large amount of bags.
Figure 11:
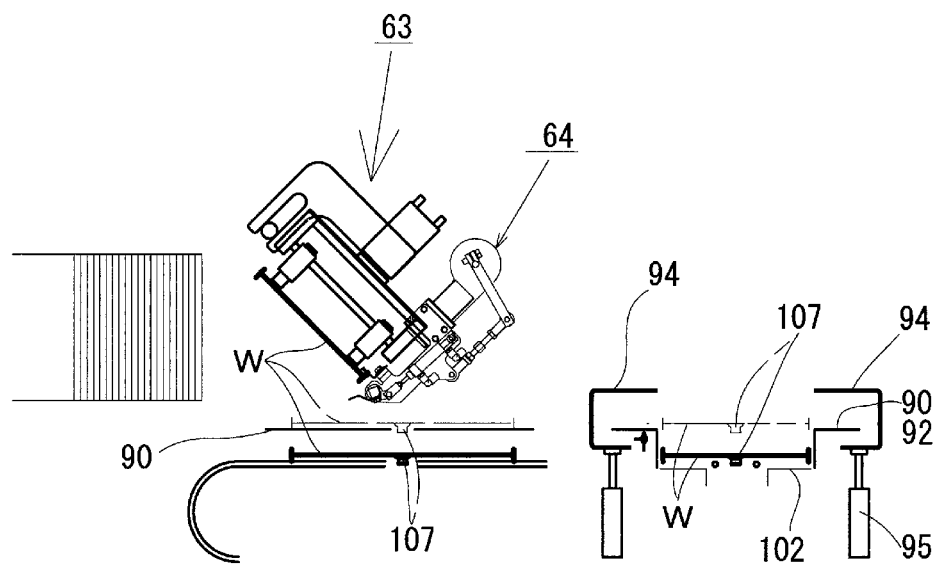

FIGS. 9 to 11 show the usage condition of the apparatus for supplying a large amount of bags according to the present invention. In the bag stocking mechanism 50 on the left side in FIG. 9(1), a large amount of bags W is standing with the openings and bottoms laterally placed on opposite sides, equalizing differences in thickness between both sides of the bags. Thus, the large amount of bags that are entirely arranged in parallel in proper alignment are stocked in the bag stocking passage 52.

First, in FIG. 9(1), the parallel rods 66 of the bag pickup mechanism 63 are rotated clockwise about the main rod 67 such that the suction faces of the suckers 76 face the surface of the bag Wa on the end of the bag stocking mechanism 50. In this state, the operation rod 77A of the air cylinder 77 is extended so as to pick up the bag Wa on the end of the bag stocking mechanism 50 by means of the suckers 76 attached to the slide rod 79. When the suckers 76 suck the front bag Wa, the operation rod 77A of the air cylinder 77 contracts. The bag delivery mechanism 64 still stands by in a stop state.

In FIG. 9(2), the bag pickup mechanism 63 sucks the front bag Wa of the bag stocking mechanism 50 and rotates the parallel rods 66 by 45° counterclockwise about the main rod 67; meanwhile, the bag delivery mechanism 64 slides the sliding portion 85 downward to a lowest position with the link 89 in order to receive the bag Wa of the bag pickup mechanism 63, and the outer shaft 82 is rotated 45° clockwise with the opened holding portion 88. At a position where the holding portion 88 holds the bag W held by the suckers 76 of the bag pickup mechanism 63, the air cylinder 87 is operated to hold the bag W with the holding portion 88 (See FIG. 5(B)).

FIG. 10(3) shows a front view and a side view of the bag stocking mechanism 50 and the bag transport mechanism 100. In FIG. 10(3), the bag delivery mechanism 64 having received the bag W from the bag pickup mechanism 63 is directly rotated downward to place the bag W on the bag table 90. The bag W bridged over between the counter parts 92,92 of the bag table 90 is placed on the bag table 90 as shown in the right side of FIG. 10(3). At this point, the opening and bottom of the bag W are not pressed onto the bag table 90 by the retainer plate 94.

In FIG. 10(4), the bag pickup mechanism 63 rotates 45° clockwise to pick up the subsequent bag W from the bag stocking mechanism 50. The bag delivery mechanism 64 operates the air cylinder 95 with the bag W placed on the bag table 90, allowing the retainer plates 94 to hold the opening and bottom of the bag W on the bag table 90. At the same time, as shown in FIG. 6, the air cylinder 98 of the detection unit 91 is operated to press the bag W with the detected plate 96. As has been discussed, the bags W are stocked with the openings and bottoms laterally reversed in the bag stocking mechanism 50. Thus, in FIG. 6, whether the opening of the bag is located on the right or the left is decided depending upon a stocked state. In this case, the detected plate 96 presses one side of the bag W while the measuring sensor 97 vertically measures a distance of the detected plate 96. Since the opening has a zipper, the detected plate 96 is lifted higher than the bottom according to the zipper. Thus, whether the opening or the bottom is pressed is decided depending upon the value of the measuring sensor 97.

In FIG. 10(4), the elevating unit 115 of the bag turning mechanism 105 lifts the bag turning mechanism 105; meanwhile, the bag turning sucker 107 moves up to suck the center of the back side of the bag W held by the retainer plate 94 of the bag table 90.

In FIG. 11(5), the bag delivery mechanism 64 is going to receive the subsequent bag W from the bag pickup mechanism 63. According to a measurement result of the measuring sensor 97, the rotation direction of the bag turning sucker 107 is determined depending upon whether the opening or the bottom of the bag is located near the detection unit 91. Subsequently, the air cylinder 95 is operated to lift the retainer plates 94 and the detected plate 96, releasing the bag W. The rotary actuator 110 in FIG. 8 is then operated to rotate the suction pipe 108 by 90° via a bracket 109. The rotation direction of the bag W is determined such that the opening of the bag W transported by the bag transport mechanism 100 in the subsequent step is sucked by the suckers 119 of the opening lift mechanism 106 with the opening directed downstream (to the front end of the bag transport mechanism 100). In this way, the bag turning mechanism 105 rotates the bag W clockwise or counterclockwise such that the opening can be sucked by the opening lift mechanism 106.

A change of the dimensions of the bag W may vary the center of the bag W in the width direction. Thus, if the bag W is turned by the bag turning mechanism 105, the bag may be rotated out of balance, leading to inconvenience. To address this problem, the screw thread 113 of the positioning mechanism in FIG. 8 is rotated by the handle 114 to adjust the position of the bag turning mechanism 105, allowing the bag turning sucker 107 to suck the center of the bag W in the vertical and horizontal directions from the bottom.

In FIG. 11(6), the bag W rotated 90° in a proper direction in the foregoing step is sucked by the bag turning sucker 107. In this state, the elevating unit 115 moves down the bag turning mechanism 105 and places the bag W on the side plates 102 and the strip belt conveyor 101 of the transport mechanism 100 as shown in FIG. 6. When the bag W sucked by the bag turning sucker 107 is rotated 90°, the upper bag W in FIG. 6 is rotated in the width direction of the bag W. Thus, the bag W bridged over on the bag table 90 can be passed between the counter parts 92,92 and can be placed on the side plates 102 and the strip belt conveyor 101.

The bag W placed on the side plates 102 and the strip belt conveyor 101 is transported downstream by the bag transport mechanism 100 and is stopped at a predetermined position by the optical sensor 103 on the end of the bag transport mechanism 100. After that, the link 118 of the opening lift mechanism 106 is pivoted downward, the stopped bag W is sucked by the suckers 119, and then the bag W of the opening lift mechanism 106 is received by the bag delivery mechanism (not shown) and is delivered to the rotary packaging machine. In the rotary packaging machine, a material to be packaged is filled and the opening of the bag W is sealed.

Another First Embodiment

In the foregoing embodiment, the openings of the bags W are laterally reversed to stock a large amount of bags in the bag stocking mechanism 50. In the case of a small amount of bags W, the thickness of the opening and the bottom of the bag does not need to be taken into consideration. Thus, the bags may be stocked in the bag stocking mechanism 50 with the openings aligned as in the related art. Hence, the structure of the bag stocking mechanism 50 does not always need to arrange the laterally reversed openings of the bags. Moreover, in the foregoing embodiment, the apparatus for supplying a large amount of bags stocks a large amount of zippered bags and supplies the bags to the packaging machine. In the case of a flat bag, multiple flat bags do not vertically vary in thickness and thus are not curved. In this case, controllers may be switched to prevent rotations of the bags W.

Figure 21:
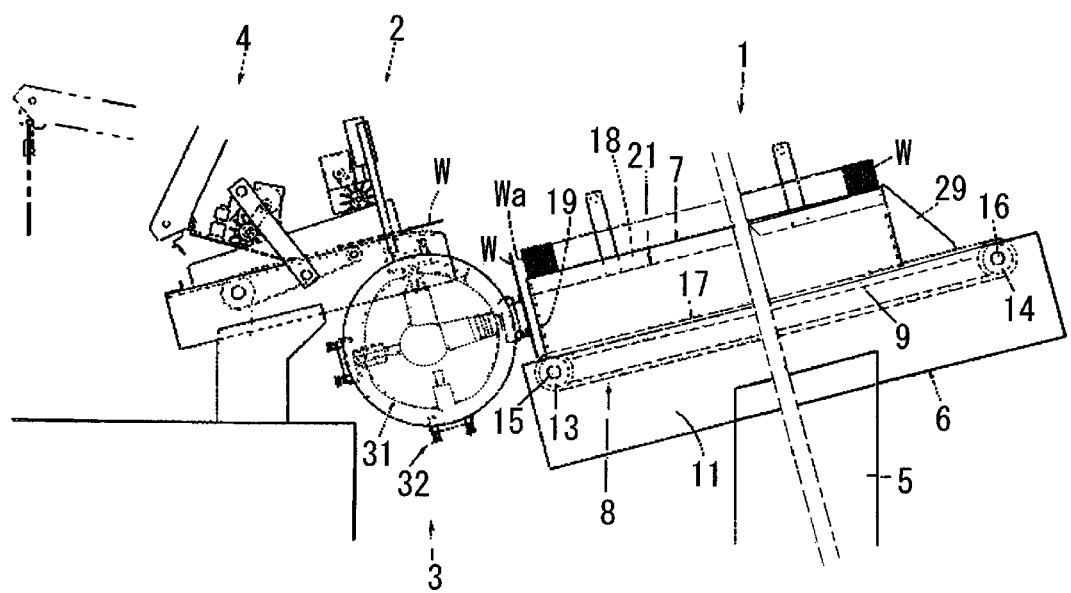
FIG. 21 is a side view of a related bag supplying apparatus.

In the foregoing embodiment, the bag stocking passage 52 of the bag stocking mechanism 50 is horizontally fixed with the bags stocked in a standing position. The bag stocking passage 52 may be inclined as in the related bag supplying device of FIG. 21.

Another Second Embodiment

The bag pickup unit includes the two mechanisms: the bag pickup mechanism 63 and the bag delivery mechanism 64. The present invention is not limited to these two configurations. For example, only the bag pickup mechanism 63 in FIG. 5(A) may be provided. The bag W sucked by the suckers 76 of the bag pickup mechanism 63 may be placed on the bag table 90 to detect the orientation of the bag W by means of the detection unit 91 while being held by the retainer plates 94. The absence of the bag delivery mechanism 64 simplifies the structure.

Another Third Embodiment

The bag orientation detection unit includes the bag table 90 and the detection unit 91. The bag W on the bag table 90 is held by the retainer plates 94 to detect the thickness of the bag W, thereby detecting the orientation of the bag. However, the bag orientation detection unit may be a noncontact detection unit. For example, the orientation of the bag W may be decided by imaging of a CCD camera or detection of surface irregularities or a thickness with a laser beam.

The second embodiment and the noncontact detection unit may be combined such that the bag pickup mechanism 63 shown in FIG. 5(A) includes a turning unit (a drive unit, e.g., a motor) for turning the slide rod 79 so as to turn the bag W sucked by the suckers 76. This configuration eliminates the need for the bag table 90 and the retainer plate 94. Specifically, the bag is picked up from the bag stocking mechanism 50 by the bag pickup mechanism 63 and then is placed in the bag transport mechanism 100; meanwhile, the orientation of the bag W may be detected by the noncontact detection unit and corrected by the bag turning unit before being directly transported by the bag transport mechanism 100.

(First Modification)

As shown in FIG. 1, the bag pickup mechanism 63 of the embodiment includes the parallel rods 66 horizontally supported like cantilevers on the side of the first driving box 65. As shown in FIG. 5(A), the slide plates 75 shaped like reversed letter L are slidably provided on both ends of the parallel rods 66. The air cylinder 77 is attached to the lower end of the slide plate 75.

Figure 12:
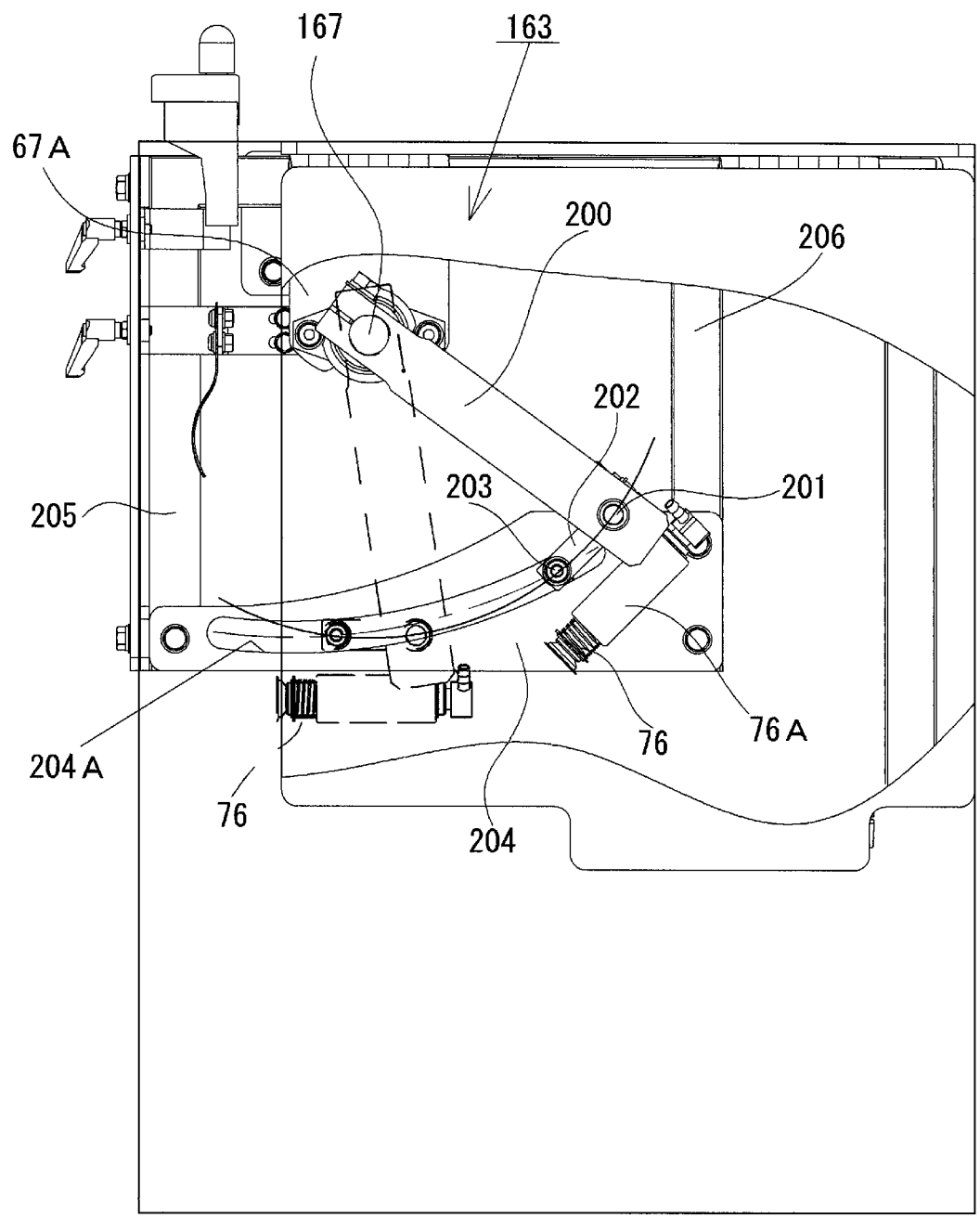
FIG. 12 is a front view showing a first modification of a bag pickup mechanism.

FIG. 12 shows the first modification of the bag pickup mechanism 63. The modification features a simpler configuration with a smaller number of components than the bag pickup mechanism 63 of the embodiment. A bag pickup mechanism 163 according to the first modification will be described below in accordance with the accompanying drawings.

In FIG. 12, reference numeral 167 denotes a main rod that rotates in connection with a drive mechanism (not shown). One end of the main rod 167 is supported by the first driving box 65 and the other end of the main rod 167 is supported by a support member 67A from above. The upper ends of two plate-like parallel pivot arms 200 are fixed on both ends of the main rod 167. A support rod 201 is pivotally disposed between the lower ends of the two pivot arms 200. Two blocks 76A having the suckers 76 are fixed near both ends of the support rod 201. One end of a crank rod 202 is connected to one end of the support rod 201 while a rotating wheel 203 is provided on the other end of the crank rod 202. The rotating wheel 203 is fit into a guide groove 204A of a guide plate 204.

One end of the guide plate 204 has a small width while the other end of the guide plate 204 increases in width with a curved upper side. The guide plate 204 is a thick plate that has a rectangular figure on the other end, is flat on the base, and is substantially trapezoidal in overall view. One end of the guide plate 204 is supported from above by a support 205 near the bag stocking mechanism 50 while the other end of the guide plate 204 is supported from above by a support 206 near the bag delivery mechanism 64. The guide groove 204A formed on the guide plate 204 is curved upward from the left end to the right end. One end of the guide groove 204A is formed such that the suction faces of the suckers 76 come into contact with the bag Wa in parallel on the front end of the bag stocking mechanism 50.

In the bag pickup mechanism 163, when the main rod 167 rotates to the left and right, the pivot arm 200 pivots about 45° according to the rotation of the main rod 167. The pivot arm 200 pivots such that the suckers 76 pivotally stop at a leftmost point. In this state, the rotating wheel 203 is located on one end of the guide groove 204A, keeping the blocks 76A in a horizontal position via the crank rod 202 and the support rod 201. With this configuration, the suction faces of the suckers 76 attached to the blocks 76A come into contact with the bag Wa in parallel on the front end of the bag stocking mechanism 50, allowing the suckers 76 to reliably suck and pick up the bag W.

When the main rod 167 rotates counterclockwise, the pivot arm 200 also pivots 45° counterclockwise and then stops with the bag W sucked by the suckers 76. The rotating wheel 203 of the crank rod 202 is guided by the guide groove 204A to revolve to the right direction while moving upward. Thus, the crank rod 202 rotates according to the movement of the rotating wheel 203. Moreover, the support rod 201 connected to the crank rod 202 also pivots and thus the suckers 76 of the blocks 76A fixed to the support rod 201 rotate downward, allowing the holding portion 88 of the bag delivery mechanism 64 to hold the bag W sucked by the suckers 76.

(Second Modification)

In the foregoing embodiment, the gate plate 61 is provided on the end of the frame 56 having the side feed conveyor 53. The stopping plate 62 is placed between the upper parts of the ends of the gate plates 61. The stopping plate 62 holds the front bag Wa of the bags pressed forward of the bag stocking passage 52 by means of the side feed conveyor 53 and the bag pressing member so as not to protrude.

Figure 13:
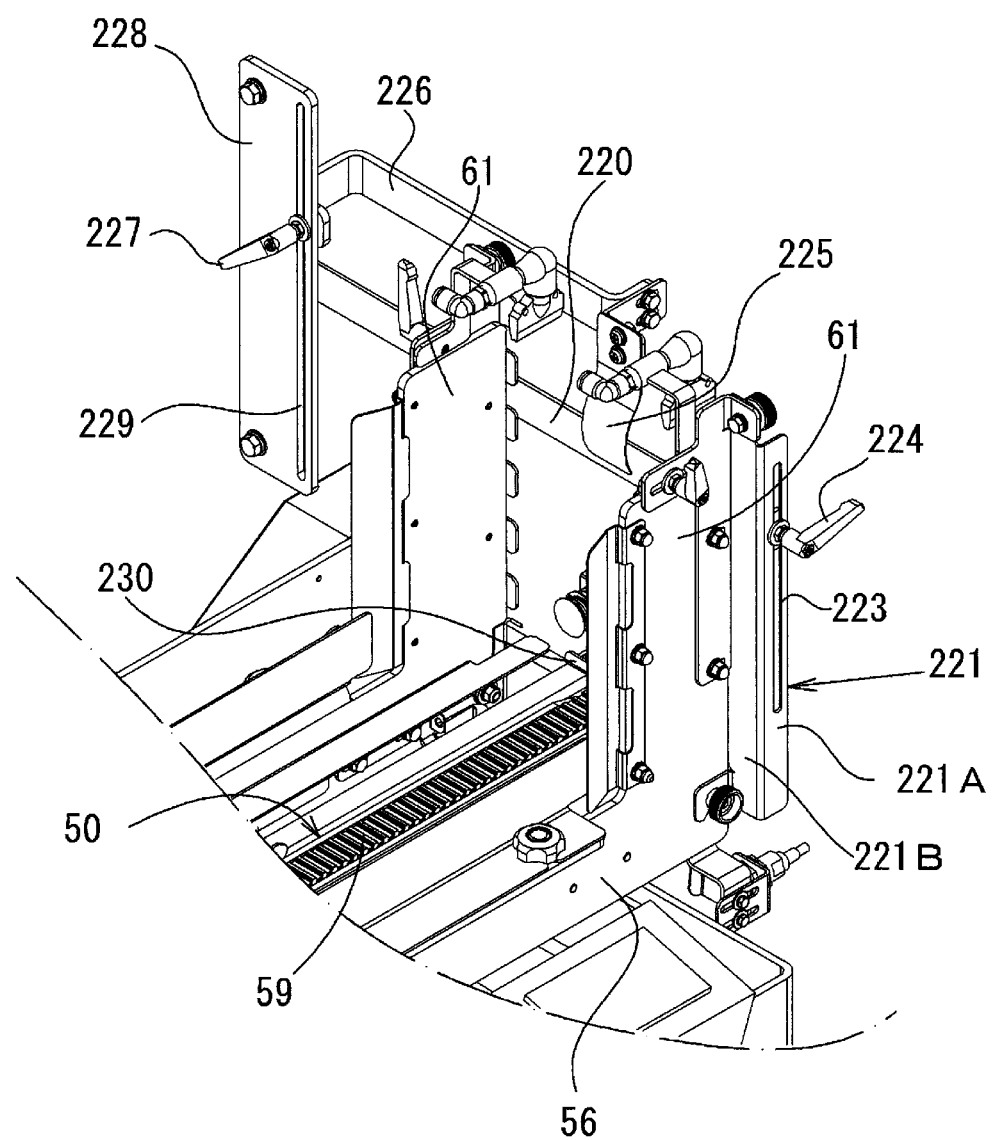
FIG. 13 is a perspective view showing a second modification of the bag stocking mechanism.
Figure 14:
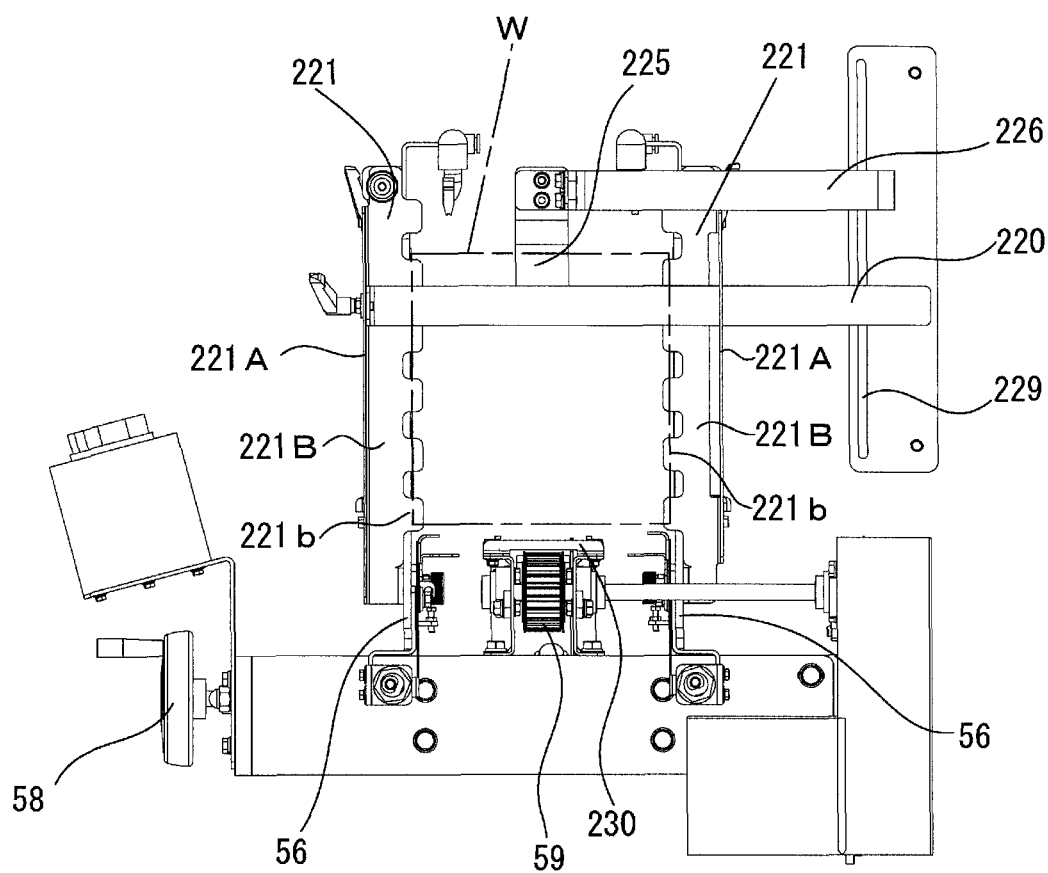
FIG. 14 is a side view showing the second modification of the bag stocking mechanism.

In the second modification shown FIGS. 13 and 14, the vertical and horizontal four sides of the bags Wa stocked in the bag stocking mechanism 50 are retained so as not to protrude the front bag Wa out of the bag stocking mechanism 50. A plate placed across the upper parts of the front ends of the pair of gate plates 61 is a stopping plate 220 of the second modification. The stopping plate 220 can evenly press the upper side of the bag W. The stopping plate 220 is a rectangular elongated plate having an adjustable height. The stopping plate 220 is placed on function plates 221 that are vertically attached to the front ends of the gate plates 61 and are L-shaped in plan view. The function plate 221 has two functions as a placement portion 221A for placing the stopping plate 220 and a holding portion 221B that laterally restrains the bags Wa so as not to protrude the front bag Wa out of the bag stocking mechanism 50 as will be described later. The single function plate having the two functions may be replaced with two separated members having the functions of the placing portion 221A and the holding portion 221B.

As has been discussed, the function plate 221 is an L-shaped plate in plan view. The front side of the function plate 221 has a vertical slit 223. One end of the stopping plate 220 is fixed to a fixing handle 224 through the slit 223. When the fixing handle 224 is loosened, the stopping plate 220 vertically slides with an adjustable height along the slit 223. Although not illustrated, the surface of the function plate 221 with the slit 223 formed has a scale for fixing the stopping plate 220. This can easily set the height of the stopping plate 220 according to the size of the bag W.

The other function plate 221 also has a vertically extended slit (not shown). As shown in FIG. 14, the horizontal dimension of the stopping plate 220 is larger than a distance between one and the other of the function plates 221 while the stopping plate 220 projects through the slit of the other function plate 221 with one end unfixed to the function plate 221. With this configuration, the handle 58 is rotated according to the size of the bag W so as to adjust a distance between the frames 56 by means of the screw thread. Also in this case, the stopping plate 220 passes through the slit of the other function plate 221 without interfering an adjustment to a distance between the frames 56. Moreover, the stopping plate 220 can be vertically slid along the slits of the function plates 221 only by loosening the fixing handle 224, achieving a height adjustment.

As has been discussed, the rear side of the function plate 221 has the holding portion 221B that laterally restrains the bags W so as not to protrude the front bag W out of end of the bag stocking passage 52. As shown in FIG. 14, the holding portion 221B has irregularities at predetermined intervals. Since projecting portions 221*b* hold the side edges of the bag W, pickup of more than one bag W is expected to be prevented. Kinds of function plates 221 may be prepared such that the holding portions 221B vary in the number of irregularities at different intervals according to the size of the bag W.

Furthermore, a lower-part retainer plate 230 is provided under the end of the bag stocking mechanism 50. As shown in FIG. 14, the lower-part retainer plate 230 is disposed on the downstream side of the bag pressing belt 59 so as to restrain the lower parts of the bags W.

As has been discussed, in the second modification, the upper end of the bag W is held by the stopping plate 220, both sides of the bag W are held by the holding portions 221B, and the lower part of the bag W is retained by the lower-part retainer plate 230. Thus, even if the bags W stocked in a standing position in the bag stocking mechanism 50 are strongly pressed forward, the front bag Wa can be stably kept in a position sucked by the suckers 76.

In the second modification, a central retainer plate 225 is further provided to retain an upper central portion of the bag W. The central retainer plate 225 is located in the upper central portion of the bag W. When the front bag Wa is sucked and picked up by the suckers 76, the central retainer plate 225 presses backward the second bag W and thus the rear second bag W is not collected with the front bag Wa. The central retainer plate 225 substantially eliminates mistakes of simultaneously collecting two of the bags W, thereby picking up the bags with higher stability. The central retainer plate 225 is a rectangular plate that is made of stainless steel (SUS304) as a spring material and protrudes to the bag W. The upper end of the central retainer plate 225 is supported by a laterally extending support plate 226. The rear end of the support plate 226 is fixed to a rectangular clamping plate 228 with a fixed handle 227. The clamping plate 228 also has a slit 229 formed. The support plate 226 can be vertically slid along the slit 229 by releasing the fixing handle 227 and thus the contact position of the central retainer plate 225 with the bag W can be adjusted according to the size of the bag W.

(Third Modification)

Figure 15:
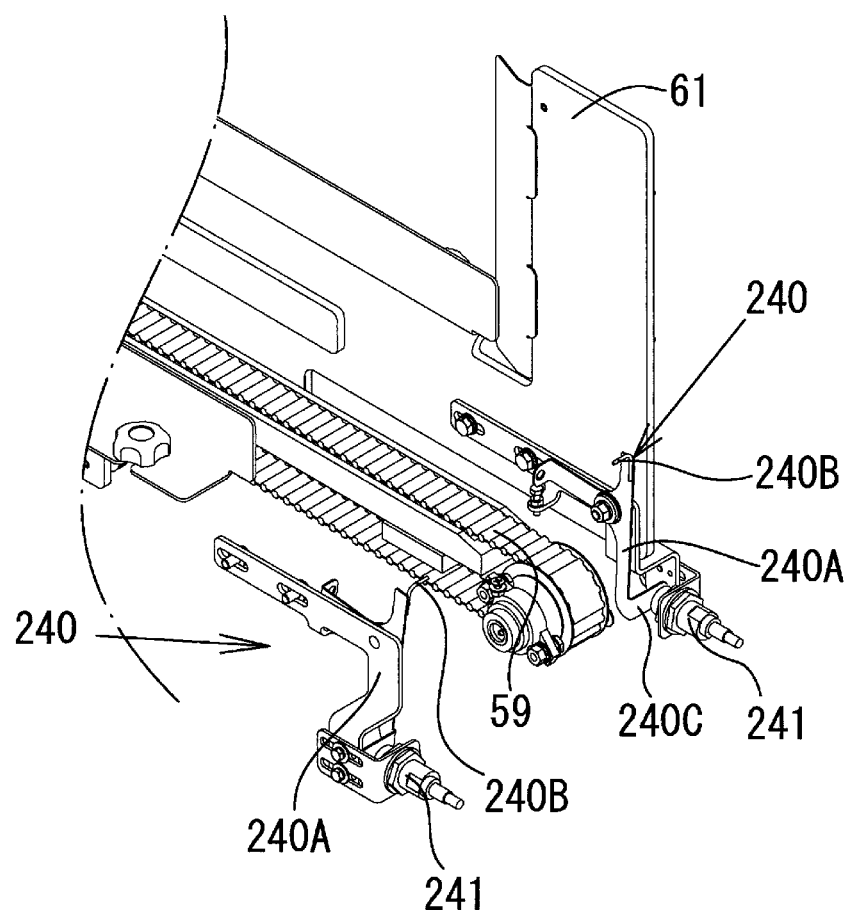
FIG. 15 is a perspective view showing a third modification of the bag stocking mechanism.

In the foregoing embodiment, as shown in FIG. 4, the bag detection portion 74 that detects the front bag Wa is disposed only at a point on the end of the bag stocking passage 52. In a third modification, as shown in FIG. 15, bag detection portions 240 are provided at two points inside the gate plates 61. Since the bag detection portions 240 are provided at the two points inside the gate plates 61, if the front bag Wa is not detected by the bag detection portions 240 simultaneously at the two points, the bag pressing belt 59 is operated to press the bags forward and keeps pressing the bags W on the bag pressing belt 59 until the bag W is simultaneously detected by the bag detection portions 240 at the two points. With this configuration, the bag detection portion 240 detects whether or not the bag W is located on the end of the bag stocking mechanism 50. Furthermore, even laterally twisted bags can be corrected into an upright standing position, thereby preventing erroneous suction of the suckers 76.

The bag detection portions 240 in FIG. 15 are pivotally supported inside the gate plates 61. A protrusion 240B is formed at an upper central portion of an L-shaped rocking portion 240A. When the bag W comes into contact with the protrusion 240B, the rocking portion 240A is rotated to separate a lower end portion 240C from a proximity switch 241. Whether the bag W is in contact with the bag detection portion 240 or not can be detected thus.

(Fourth Modification)

In the foregoing embodiment, as shown in FIG. 4, the injection hole for air injection is formed on the end of the alignment rod 73. Air from the injection hole is fed to both ends of the bags W, leading to air injection between the bags. Thus, the front bag Wa is easily picked up by the suckers 76 of the bag pickup unit, which will be described later.

Figure 16:
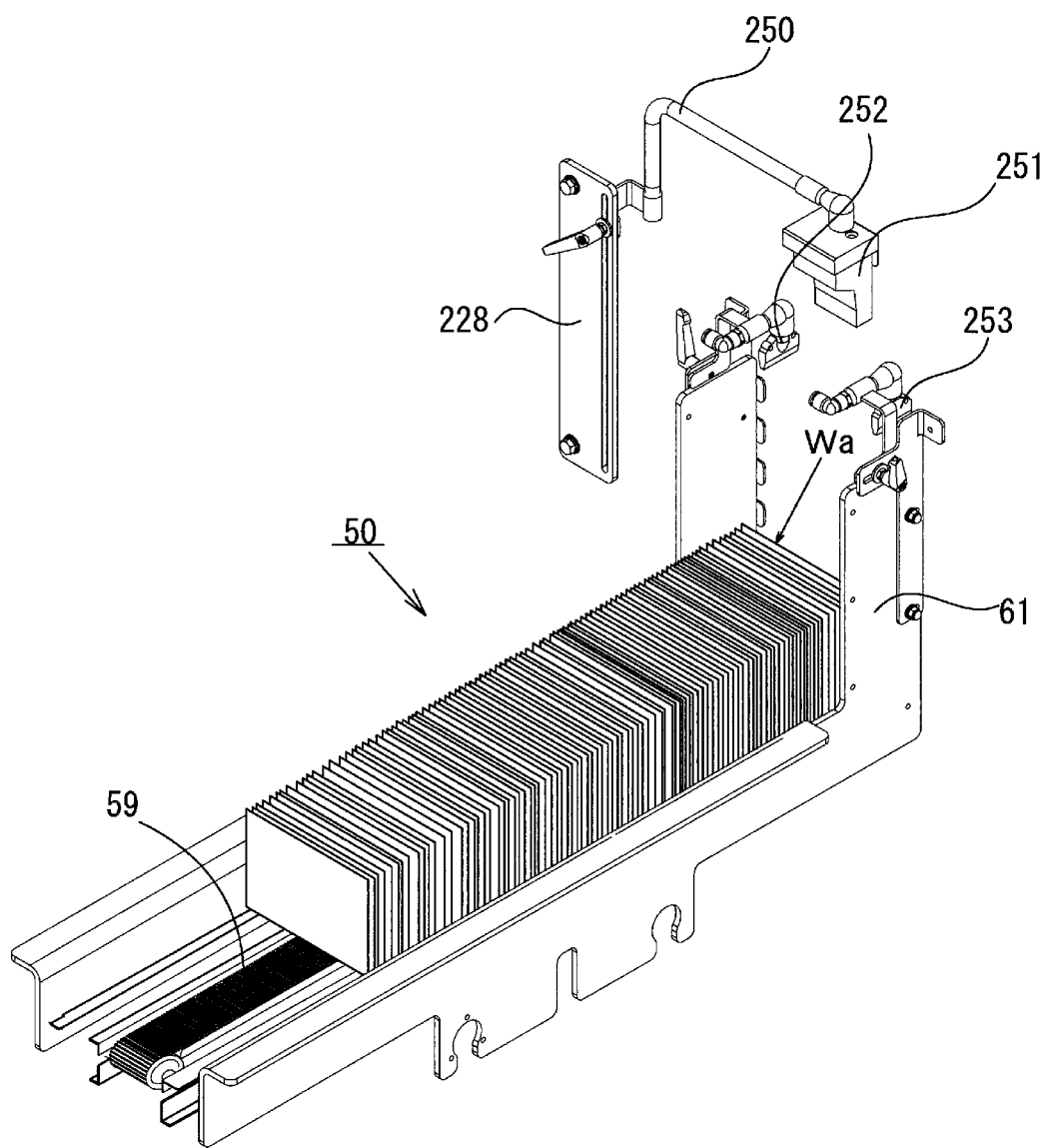
FIG. 16 is a perspective view showing a fourth modification of the bag stocking mechanism.
Figure 17:
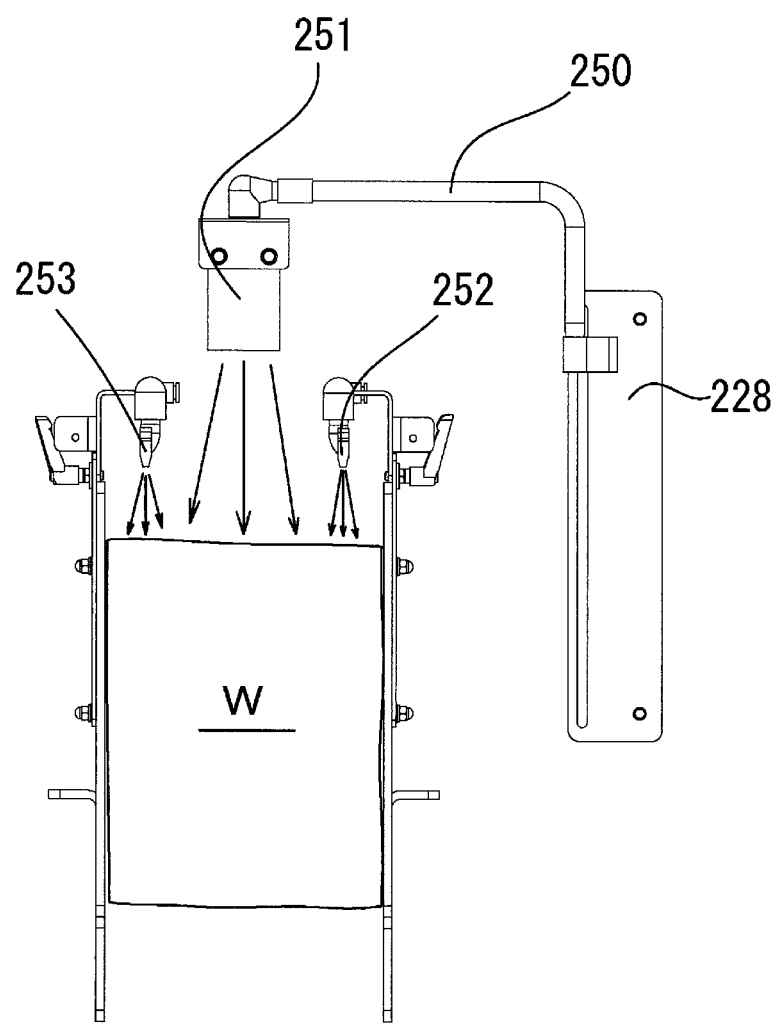
FIG. 17 is a side view showing the fourth modification of the bag stocking mechanism.

FIGS. 16 and 17 show a fourth modification of the embodiment. In the fourth modification, three air nozzles are disposed on the upper part of the end of the bag stocking mechanism 50. A large first air nozzle 251 disposed on the upper part of the end is fixed to a clamping plate 228 via a pipe 250 such that a slit-like injection hole is in parallel with the bag W. Second and third air nozzles 252 and 253 provided inside the upper parts of the gate plates 61 are adjacent to the bags W such that slit-like injection holes cross the bag W.

Generally, when the tightly stacked front bag Wa is collected by the suckers 76, the second bag W may be also similarly collected because the first and second bags are in intimate contact with each other under a vacuum. As has been discussed, air is injected from the first, second, and third air nozzles 251, 252, and 253 so as to forcibly inject air between the first and second bags W. This reduces the degree of vacuum, suppressing the occurrence of mistakes of simultaneously picking up two bags.

(Fifth Modification)

In the foregoing embodiment, the bag pressing member 60 is set vertically detachably on the bag pressing belt 59. When the bag pressing belt 59 is rotated, the bag pressing member 60 slowly moves forward to press the bags stocked in the bag stocking passage 52 from the rear to the front and then delivers the bags to the bag pickup unit. Moreover, the side feed conveyors 53 are disposed on both sides of the bag stocking passage 52 and the strip belt 72 is rotated to slowly feed the bags forward from both sides.

Figure 18:
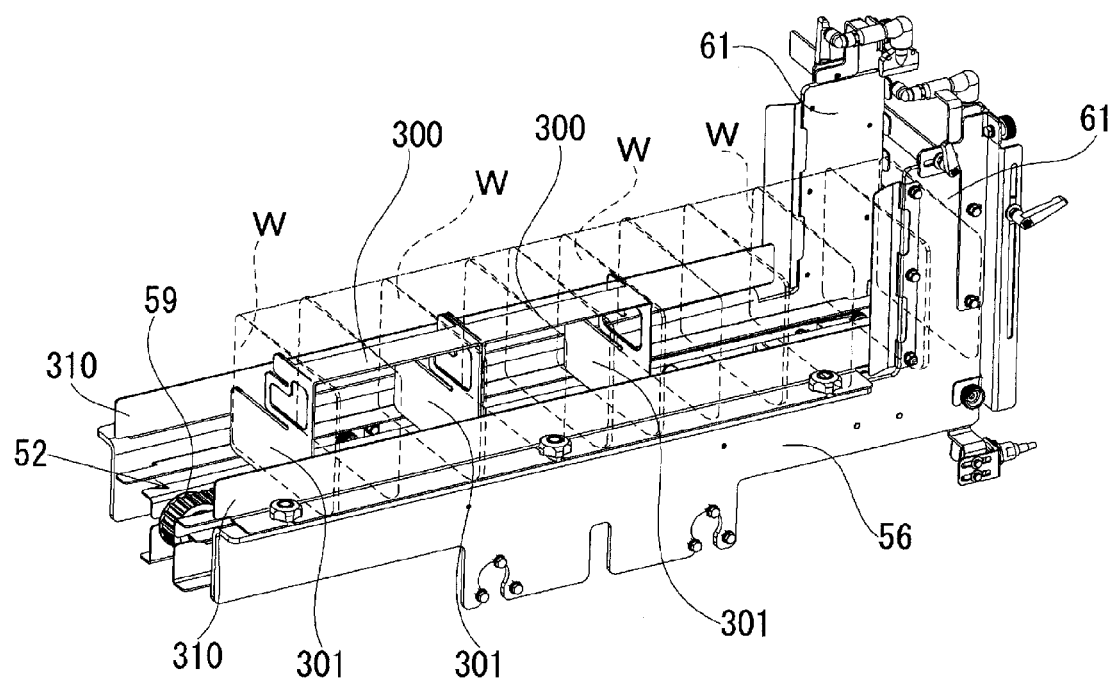
FIG. 18 is a perspective view showing a fifth modification of the bag stocking mechanism.

FIG. 18 is a perspective view showing a fifth modification of the embodiment. In the fifth modification, as will be described later, the bag pressing member 60 is replaced with refill tools 300 for the apparatus for supplying a large amount of bags. In the fifth modification, the side feed conveyors 53 are not provided and long stopping plates 310 that are L-shaped in cross section are attached along the frames 56 so as to hold the refill tools 300 onto the frames 56.

Figure 19:
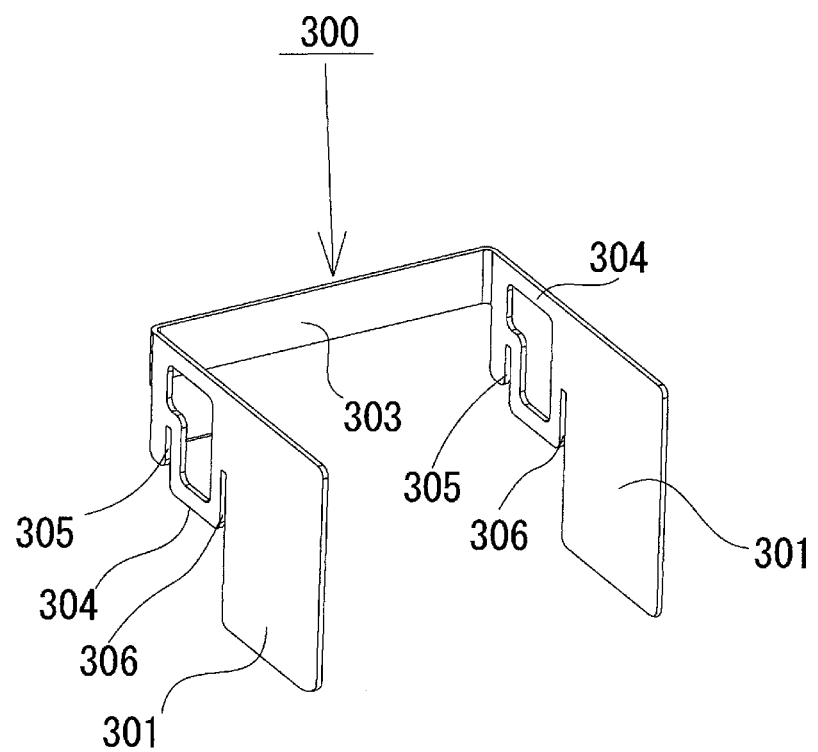
FIG. 19 is a perspective view showing a refill tool for the fifth modification of the bag stocking mechanism for the apparatus for supplying a large amount of bags.

FIG. 19 is a perspective view of the refill tool 300. In a packaging operation, the bag stocking passage 52 needs to be refilled with the bags W with a decrease in the number of bags W stocked in the bag stocking passage 52. The bag stocking passage 52 is hard to refill because the thin bags W are likely to be fell sideways or be curved. The refill tools 300 are necessary for continuously and easily refilling the bag stocking passage 52 without stopping the apparatus for supplying a large amount of bags. The refill tools 300 are usable for the bag stocking mechanism 50 described in the foregoing embodiment.

The refill tool 300 has two plate-like partition plates 301 spaced at predetermined intervals. A rectangular connecting plate 303 connects the corners of the partition plates 301. The partition plate 301 is cut stepwise with a step portion 304 formed so as to be fit into the bag stocking passage 52. The partition plate 301 is narrower and higher than the bag stocking passage 52, thereby stably placing the bags W in an upright position in the bag stocking passage 52. The partition plates 301 are spaced such that the bag stocking passage 52 is refilled with a sufficient number of bags W and the bulk of the bags W can easily stand.

Figure 20:
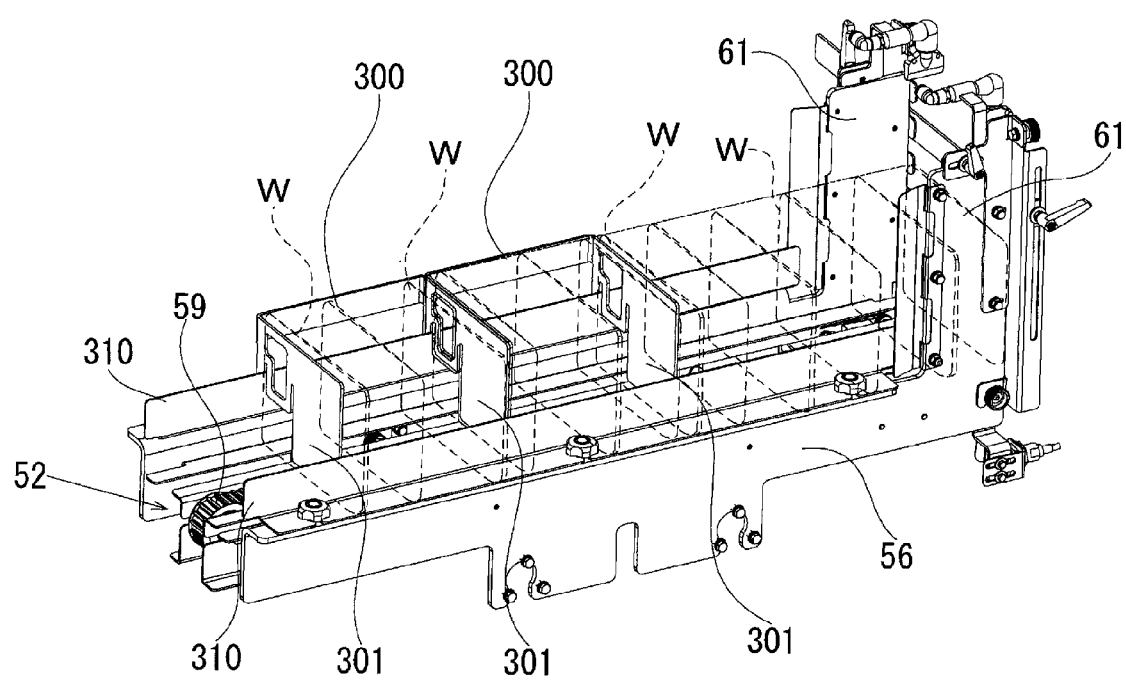
FIG. 20 is a perspective view showing a fifth modification of the bag stocking mechanism.

As shown in FIG. 19, locking slits 305 and 306 are formed on both sides of the step portion 304 of the partition plate 301 and are used for refilling the bags W. The outer locking slit 305 is used for the large bag W while the inner slit 306 is used for the small bag W. The slits are used depending on the size of the bag W. FIG. 20 is a perspective view for refilling the bags W. As shown in the perspective view, the locking slits 305 are locked onto the stopping plate 310 to fix the refill tools 300 in the bag stocking passage 52 during refilling of the bags W.

As has been discussed, similar to the foregoing embodiment, the opening sides and bottom sides of a certain number of the bags W, e.g., ten or twenty of the bags W being laterally reversed are stocked in the refill tools 300 located in the bag stocking passage 52 so as to equalize differences in thickness between the opening side and the bottom side. Thus, the bags W are stocked in proper alignment without deformation.

As shown in FIG. 18, the bags W are placed between the partition plates 301 and then the refill tools 300 are laid down from the locking state. In FIG. 18, the two refill tools 300 are used to refill the bag stocking passage 52 with the bags W and thus the front refill tool 300 is removed. Since the refill tools 300 are placed on the bag pressing belt 59, a continuous operation of the apparatus for supplying a large amount of bags transfers the refill tool 300 to the front gate plates 61 via the bag pressing belt 59. The refill tool 300 supports the rear of the bags so that the bulk of the bags does not collapse, and then the bags are entirely delivered to the bag pickup mechanism 63 according to a movement of the bag pressing belt 59.

In the foregoing embodiment, as shown in FIG. 1, the bag pressing member 60 vertically set on the bag pressing belt 59 may be removed so as not to interfere with the bags W after refilling with the refill tools 300.

The shape of the partition plate 301 is not limited to that of FIG. 19 as long as the two partition plates 301 are fit into the bag stocking passage 52 and are connected to each other at a predetermined interval via the connecting plate 303.

INDUSTRIAL APPLICABILITY

The present invention is useful for an apparatus for supplying a large amount of bags vertically varying in thickness, e.g., a standing pack and a gusset bag.

REFERENCE SIGNS LIST 50 bag stocking mechanism (bag stocking unit)
52 bag stocking passage
53 side feed conveyor
59 bag pressing belt
60 bag pressing member
63 bag pickup mechanism (bag pickup unit)
64 bag delivery mechanism (bag pickup unit)
66 parallel rod
67 main rod
68 sub rod
70 screw rod
73 alignment rod
74 bag detection portion
75 slide plate
76 sucker
76A block
77 air cylinder
90 bag table (bag orientation detection unit)
91 detection unit (bag orientation detection unit)
92 counter part
94 retainer plate
96 detected plate
97 measuring sensor
100 bag transport mechanism (bag transport unit)
105 bag turning mechanism (bag turning unit)
107 bag turning sucker (bag turning unit)
113 screw thread (positioning mechanism)
167 main rod
200 pivot arm
201 support rod
202 crank rod
204 guide plate
204A guide groove
220 stopping plate
221B holding portion
225 central retainer plate
230 lower-part retainer plate
240 bag detection portion
251 first air nozzle
252 second air nozzle
253 third air nozzle
300 refill tool
301 partition plate
303 connecting plate
W bag Having described the invention, the following is claimed:

1. An apparatus for supplying a large amount of bags, each being stocked to be picked up and supplied to a packaging machine, the apparatus comprising:
a bag stocking unit having a mechanism that stocks a large amount of bags and guides the stocked bags to a front end of the unit; and
a bag transport unit that transports the bags of the bag stocking unit to the packaging machine,
wherein the apparatus further comprises, between the bag stocking unit and the bag transport unit:
a bag orientation detection unit that detects an orientation of one of the bags;
a bag pickup unit that picks up the one of the bags from the bag stocking unit;
a bag table on which the picked up bag is bridged over, the bag table comprising:
counter parts on which the bridged over bag is placed; and
retainer plates that press and hold the bridged over bag on the counter parts from an opening side and a bottom side of the bridged over bag; and
a bag turning unit that turns the bridged over bag in a predetermined transport direction of the bag transport unit according to the detected orientation of the bag.

2. The apparatus for supplying a large amount of bags according to claim 1, wherein the bag pickup unit comprises:
a bag pickup mechanism that picks up the bag from the bag stocking unit; and
a bag delivery mechanism that receives the picked up bag from the bag pickup mechanism and delivers the picked up bag to the counter parts.

3. The apparatus for supplying a large amount of bags according to claim 1, wherein the bag orientation detection unit comprises a detection unit that detects a thickness of at least one of upper and lower ends of the bag and determines the orientation of the bag.

4. The apparatus for supplying a large amount of bags according to claim 3, wherein the counter parts are disposed in parallel, and wherein the detection unit comprises:
- a detected plate that presses the bridged over bag on the counter parts; and
- a measuring sensor that measures a thickness of the bridged over bag by measuring a position of the detected plate.

5. The apparatus for supplying a large amount of bags according to claim 4, wherein the measuring sensor detects a combined plate of the retainer plate and the detected plate or the measuring sensor detects the retainer plate also serving as the detected plate.

6. The apparatus for supplying a large amount of bags according to claim 4, wherein the counter parts of the bag table are spaced so as to bridge over the bag in a longitudinal direction and so as not to hold the bag in a width direction,
wherein the bag transport unit is disposed from a lower part of the counter parts to the packaging machine, and
wherein the bag turning unit turns the bag bridged over on the counter parts in the longitudinal direction to the width direction and moves the bag downward from the bag table to transfer the bag onto the bag transport unit.

7. The apparatus for supplying a large amount of bags according to claim 6, wherein the bag turning unit includes a positioning mechanism that adjusts a position of the bag turning sucker according to dimensions of the bag.

8. The apparatus for supplying a large amount of bags according to claim 1, wherein the bag turning unit includes a bag turning sucker that sucks the bag detected by the bag orientation detection unit, and a bag turning mechanism that turns the bag turning sucker having the sucked bag in the transport direction of the bag transport unit.

9. The apparatus for supplying a large amount of bags according to claim 8, wherein the bag turning unit includes a positioning mechanism that adjusts a position of the bag turning sucker according to dimensions of the bag.

10. The apparatus for supplying a large amount of bags according to claim 1, wherein the bag turning unit includes a positioning mechanism that adjusts a position of the bag turning sucker according to dimensions of the bag.

11. The apparatus for supplying a large amount of bags according to claim 1, wherein the bag stocking unit includes a bag stocking passage that stocks a large amount of bags, the bag stocking passage containing raised alignment rods that restrict movements of both ends of the bags to push out the centers of the bags so as to curve the bags forward on the way of the bag stocking passage, and a bag detection piece disposed at a middle portion on an end of the bag stocking passage so as to detect the front bag.

12. The apparatus for supplying a large amount of bags according to claim 1, wherein the bag pickup mechanism has parallel rods including a main rod connected to a drive mechanism, and a sub rod, slide plates slidably provided on both ends of the parallel rods, an air cylinder having suckers and attached to the slide plate, and a screw rod pivotally supported at a position between the main rod and the sub rod, and wherein the slide plates on both ends are moved toward and away from each other by a rotation of the screw rod so as to adjust a distance between the suckers.

13. The apparatus for supplying a large amount of bags according to claim 1, wherein the bag pickup mechanism includes pivot arms fixed on both end of a main rod connected to a drive mechanism, a support rod pivotally disposed on the pivot arms, blocks that have suckers and are fixed near both ends of the support rod, one end of the support rod is connected to one end of a crank rod, and the other end of the crank rod is guided along a guide groove of a guide plate so as to pivot the support rod.

14. The apparatus for supplying a large amount of bags according to claim 1, wherein the bag stocking unit holds an upper edge of the bag with a stopping plate, holds both sides of the bag with holding portions, and retains a lower part of the bag with a lower-part retainer plate so as not to protrude the front bag of the stocked bags out of the front end of the bag stocking unit.

15. The apparatus for supplying a large amount of bags according to claim 14, wherein the bag stocking unit includes a central retainer plate in an upper central portion of the front bag, the central retainer plate preventing simultaneous collection of two or more of the stocked bags.

16. The apparatus for supplying a large amount of bags according to claim 1, wherein the bag stocking unit includes a central retainer plate in an upper central portion of the front bag, the central retainer plate preventing simultaneous collection of two or more of the stocked bags.

17. The apparatus for supplying a large amount of bags according to claim 1, wherein the bag stocking unit includes bag detection portions that detects the front bag, at two points on both sides of an end of a bag stocking passage.

18. The apparatus for supplying a large amount of bags according to claim 1, wherein the bag stocking unit includes a bag stocking passage for stocking a large amount of bags, and an air nozzle disposed on an upper part of the end of the bag stocking passage so as to supply air between the bags.

19. The apparatus for supplying a large amount of bags according to claim 1, wherein the bag orientation detection unit comprises at least one of:
- a CCD camera that detects the orientation of the bag by imaging; and
- a mechanism that detects the orientation of the bag by detecting surface irregularities or the thickness of the bag with a laser beam.

* * * * *